US010973185B2

(12) United States Patent
Creechley et al.

(10) Patent No.: US 10,973,185 B2
(45) Date of Patent: Apr. 13, 2021

(54) CONTROL AND SENSOR SYSTEMS FOR AN ENVIRONMENTALLY CONTROLLED VERTICAL FARMING SYSTEM

(71) Applicant: MJNN LLC, South San Francisco, CA (US)

(72) Inventors: Jaremy Creechley, Laramie, WY (US); Jack Oslan, Henderson, NV (US); Nate Mazonson, Menlo Park, CA (US); Nathaniel R. Storey, Laramie, WY (US); Daniel Cook, Woodside, CA (US); Philip E. Beatty, Tualatin, OR (US); John L. Whitcher, Tualatin, OR (US); Christopher K. Conway, Loomis, CA (US); Ernest Learn, Loomis, CA (US); Michael Duffy, Duryea, PA (US); Russell Varone, Fremont, CA (US); Russell Field, Portola Valley, CA (US); William R. George, Santa Cruz, CA (US); Rob Jensen, Rocklin, CA (US); Benjamin J. Clark, Redwood City, CA (US); Matthew Barnard, Woodside, CA (US); Matteo Melani, Menlo Park, CA (US)

( * ) Notice: Subject to any disclaimer, the term of this patent is extended or adjusted under 35 U.S.C. 154(b) by 71 days.

(21) Appl. No.: 15/278,564

(22) Filed: Sep. 28, 2016

(65) Prior Publication Data
US 2018/0014486 A1    Jan. 18, 2018

Related U.S. Application Data

(60) Provisional application No. 62/369,520, filed on Aug. 1, 2016, provisional application No. 62/366,510, filed
(Continued)

(51) Int. Cl.
*A01G 31/06*    (2006.01)
*H05B 47/105*   (2020.01)
(Continued)

(52) U.S. Cl.
CPC ............... *A01G 31/06* (2013.01); *A01G 2/20* (2018.02); *A01G 7/02* (2013.01); *A01G 7/045* (2013.01);
(Continued)

(58) Field of Classification Search
CPC ........ A01G 31/02; A01G 31/06; A01G 31/04; A01G 7/02; A01G 7/45; A01G 9/026; A01G 9/246; A01G 9/247
(Continued)

(56) References Cited

U.S. PATENT DOCUMENTS 2,244,677 A    6/1941  Cornell
3,254,448 A    6/1966  Ruthner
(Continued)

FOREIGN PATENT DOCUMENTS

EP           2491784 A1    8/2012
WO    WO-2016061672 A1 *  4/2016  ............. A01G 31/02
(Continued)

OTHER PUBLICATIONS

PCT/US2016/054244 International Search Report and Written Opinion dated Dec. 20, 2016.
(Continued)

*Primary Examiner* — Peter M Poon
*Assistant Examiner* — Jeffrey R Larsen
(74) *Attorney, Agent, or Firm* — Almanac IP Advisors LLP

(57) ABSTRACT

A computer implemented system for a vertical farming system comprising at least a first crop growth module and operating in an environmentally-controlled growing cham-
(Continued)

ber, the control system comprising sensors for measuring environmental growing conditions in the environmentally-controlled growing chamber over time to generate environmental condition data, a device configured for measuring a crop characteristic of a crop grown in the crop growth module of the environmentally-controlled growing chamber to generate crop growth data and a processing device comprising software modules for receiving the environmental condition data and the crop growth data; applying an algorithm to the environmental condition data and the crop growth data to generate an improved environmental growing condition and generating instructions for adjustment of the environmental growing conditions in or around the growth module in the environmentally-controlled growing chamber to the improved environmental growing condition.

8 Claims, 12 Drawing Sheets

Related U.S. Application Data on Jul. 25, 2016, provisional application No. 62/362,380, filed on Jul. 14, 2016.

(51) Int. Cl.

| | | |
|---|---|---|
| A01G 7/02 | (2006.01) | |
| A01G 7/04 | (2006.01) | |
| A01G 9/24 | (2006.01) | |
| A01G 9/26 | (2006.01) | |
| A01G 31/02 | (2006.01) | |
| A01G 31/04 | (2006.01) | |
| H04N 7/18 | (2006.01) | |
| A01G 2/20 | (2018.01) | |
| A01G 9/029 | (2018.01) | |
| A01G 9/02 | (2018.01) | |
| A01G 27/00 | (2006.01) | |
| H05B 45/10 | (2020.01) | |

(52) U.S. Cl.
CPC ............ *A01G 9/023* (2013.01); *A01G 9/029* (2018.02); *A01G 9/246* (2013.01); *A01G 9/247* (2013.01); *A01G 9/26* (2013.01); *A01G 27/00* (2013.01); *A01G 31/02* (2013.01); *A01G 31/04* (2013.01); *A01G 31/045* (2013.01); *H04N 7/183* (2013.01); *H05B 47/105* (2020.01); *H05B 45/10* (2020.01); *Y02P 60/21* (2015.11)

(58) Field of Classification Search
USPC ................................................ 47/62, 82, 83
See application file for complete search history.

(56) References Cited

U.S. PATENT DOCUMENTS

| | | | |
|---|---|---|---|
| 3,529,379 A | 9/1970 | Richard | |
| 4,255,897 A | 3/1981 | Ruthner | |
| 4,574,520 A | 3/1986 | Arledge | |
| 4,669,217 A | 6/1987 | Fraze | |
| 5,173,079 A | 12/1992 | Gerrish | |
| 5,363,594 A | 11/1994 | Davis | |
| 5,533,302 A | 7/1996 | Lynch et al. | |
| 6,247,268 B1 | 6/2001 | Auer | |
| 6,691,135 B2 * | 2/2004 | Pickett | A01B 79/005 |
| 6,840,008 B1 | 1/2005 | Bullock et al. | |
| 7,055,282 B2 | 6/2006 | Bryan, III et al. | |
| 7,080,482 B1 | 7/2006 | Bradley | |
| 7,168,206 B2 | 1/2007 | Agius | |
| 7,406,854 B2 * | 8/2008 | Lange | G01N 21/09 73/1.06 |
| 7,559,173 B2 | 7/2009 | Brusatore et al. | |
| 7,818,917 B2 | 10/2010 | Brusatore | |
| 7,984,586 B2 | 7/2011 | Brusatore | |
| 8,266,840 B2 | 9/2012 | Jung | |
| 8,533,993 B2 * | 9/2013 | Pettibone | A01G 31/042 47/65 |
| 8,847,514 B1 | 9/2014 | Reynoso et al. | |
| 8,893,431 B2 | 11/2014 | Busch et al. | |
| 8,966,815 B1 | 3/2015 | Smiles | |
| D758,917 S | 6/2016 | Smith | |
| 9,591,814 B2 | 3/2017 | Collins et al. | |
| 2003/0182260 A1 * | 9/2003 | Pickett | A01B 79/005 |
| 2006/0162252 A1 | 7/2006 | Lim | |
| 2007/0251145 A1 | 11/2007 | Brusatore et al. | |
| 2009/0000189 A1 | 1/2009 | Black | |
| 2009/0223128 A1 | 9/2009 | Kuschak | |
| 2009/0255179 A1 | 10/2009 | Felknor | |
| 2010/0042234 A1 | 2/2010 | May et al. | |
| 2010/0146854 A1 * | 6/2010 | Cannon | A01G 9/023 47/82 |
| 2011/0025519 A1 | 2/2011 | Donaldson et al. | |
| 2012/0047801 A1 | 3/2012 | Hogan | |
| 2012/0137578 A1 | 6/2012 | Bradford et al. | |
| 2012/0311926 A1 | 12/2012 | Mittelmark | |
| 2013/0152468 A1 | 6/2013 | Huang et al. | |
| 2013/0326950 A1 * | 12/2013 | Nilles | A01G 31/06 47/62 R |
| 2014/0000162 A1 | 1/2014 | Blank | |
| 2014/0000163 A1 | 1/2014 | Lin | |
| 2014/0115958 A1 | 5/2014 | Helene et al. | |
| 2014/0165468 A1 | 6/2014 | Roeser et al. | |
| 2014/0200690 A1 * | 7/2014 | Kumar | A01G 1/001 700/90 |
| 2014/0223816 A1 | 8/2014 | Parker | |
| 2014/0352211 A1 | 12/2014 | Liotta | |
| 2015/0000190 A1 * | 1/2015 | Gibbons | A01G 27/005 47/66.6 |
| 2015/0005964 A1 | 1/2015 | Liotta | |
| 2015/0113875 A1 | 4/2015 | Liotta | |
| 2015/0173315 A1 | 6/2015 | Aznar | |
| 2015/0196002 A1 * | 7/2015 | Friesth | A01K 63/04 47/62 R |
| 2015/0223418 A1 | 8/2015 | Collins et al. | |
| 2015/0264868 A1 | 9/2015 | Smiles | |
| 2015/0313104 A1 | 11/2015 | Cottrell | |
| 2015/0334930 A1 | 11/2015 | Stoltzfus et al. | |
| 2016/0066525 A1 | 3/2016 | Duquesnay et al. | |
| 2017/0055474 A1 | 3/2017 | Storey | |

FOREIGN PATENT DOCUMENTS

| | | | |
|---|---|---|---|
| WO | WO-2016070196 A1 | 5/2016 | |
| WO | WO-2016118175 A1 | 7/2016 | |

OTHER PUBLICATIONS

PCT/US2016/054245 International Search Report and Written Opinion dated Dec. 20, 2016.
PCT/US2016/054246 International Search Report and Written Opinion dated Dec. 23, 2016.
Co-pending U.S. Appl. No. 15/278,148, filed Sep. 28, 2016.
Co-pending U.S. Appl. No. 15/278,181, filed Sep. 28, 2016.
The Coliseum grows large gardens in a small space! Growco Indoor Garden Supply. https://4hydroponics.com/hydroponics/vertical-hydroponics/coliseum (6 pgs.) (Accessed Feb. 2017).
U.S. Appl. No. 15/278,181 1st Action Interview dated Jul. 27, 2017.
U.S. Appl. No. 15/278,181 1st Action Interview dated Jun. 20, 2017.
U.S. Appl. No. 15/278,181 Office Action dated Sep. 19, 2017.
PCT/US2016/054246 International Preliminary Report on Patentability dated Jan. 24, 2019.

* cited by examiner

CONTROL AND SENSOR SYSTEMS FOR AN ENVIRONMENTALLY CONTROLLED VERTICAL FARMING SYSTEM

CROSS-REFERENCE

The present application claims priority to U.S. Provisional Patent Application No. 62/362,380, filed Jul. 14, 2016, U.S. Provisional Patent Application No. 62/366,510, filed Jul. 25, 2016 and U.S. Provisional Patent Application No. 62/369,520, filed Aug. 1, 2016, which are incorporated herein by reference in their entirety.

BACKGROUND OF THE INVENTION

This invention relates generally to a vertical hydroponic and aeroponic plant production apparatus and system and, more particularly, the invention relates to a control system configured for use in a vertical hydroponic and aeroponic plant production system comprising a controlled environment allowing for vertical hydroponic and aeroponic crop production in a fraction of the space necessary for traditional plant production techniques.

SUMMARY OF THE INVENTION

During the twentieth century, agriculture slowly began to evolve from a conservative industry to a fast-moving high-tech industry in order to keep up with world food shortages, climate change and societal changes moving away from manually-implemented agriculture techniques increasingly toward computer implemented technologies. In the past, and in many cases still today, farmers only had one growing season to produce the crops that would determine their revenue and food production for the entire year. However, this is changing. With indoor growing as an option and with better access to data processing technologies, among other advanced techniques, the science of agriculture has become more agile. It is adapting and learning as new data is collected and insights are generated.

Advancements in technology are making it feasible to control the effects of nature with the advent of "controlled indoor agriculture". Improved efficiencies in space utilization, lighting, and a better understanding of hydroponics, aeroponics, crop cycles, and advancements in environmental control systems have allowed humans to better recreate environments conducive for agriculture crop growth with the goals of greater yields per square foot, better nutrition and lower cost.

The inventors combine advances in agriculture with the increasing technological advances of industry acquired since the industrial revolution. The inventors also incorporate the more recent concept of assembly line automation, and herein have conceived a vertical farming structure within a controlled environment and having columns comprising automated growth modules. The vertical structure is capable of being moved about an automated conveyance system in an open or closed-loop fashion, exposed to precision-controlled lighting, airflow and humidity, with ideal nutritional support.

Among those technology advancements is the application of new control systems capable of machine learning, or artificial intelligence, through the assimilation of thousands or even millions of data points acquired by strategically placed sensors during the course of a growing cycle or multiple growing cycles, and further capable of automatically adjusting year-round crop growth conditions within the controlled environment such as lighting, fertilizers (nutrients), moisture, gas levels, temperature, air flow, and ultimately, packaging to produce higher yields at a lower cost per square foot due to plants' vertical growth and increased space efficiency, with reduced overall losses per planted crop, better nutritional value, visual appeal and faster growth cycles.

Additionally, a multi-stage, plant growing system has been configured for high density growth and crop yields and includes among other things, towers and/or vertical columns comprising a plurality of interchangeable growth modules, an enclosed controlled environmental growth chamber, sensors or sensor arrays and control systems capable of machine learning wherein the crops are optimally spaced and continually staged in their planting cycles utilizing the interchangeable growth modules to provide an accelerated and continuous annual production yield. The growth modules are capable of being moveably and detachably affixed to vertical columns, or stand-alone towers, within the enclosed controlled environmental growth chamber and support automated staging for planting and harvesting activities within a growth cycle. The growth modules are adaptable to monitoring by sensors, sensor arrays and control systems that are capable of automated adjustments to control mechanical operations and growing conditions within the growth chamber and to make continuous improvements to crop yields, visual appeal and nutrient content of the crops grown within the growth modules.

In a first broad aspect provided herein is a computer-implemented control system for a vertical farming system comprising at least a first crop growth module and operating in an environmentally-controlled growing chamber, the control system comprising: a sensor configured for measuring an environmental growing condition in the environmentally-controlled growing chamber over time to generate environmental condition data; a device configured for measuring a crop characteristic of a crop grown in the first crop growth module of the environmentally-controlled growing chamber to generate crop growth data; and a processing device comprising at least one processor, a memory, an operating system configured to perform executable instructions, and a computer program including instructions executable by the processing device to create an application comprising: a software module receiving the environmental condition data and the crop growth data; a software module applying an algorithm to the environmental condition data and the crop growth data to generate an improved environmental growing condition; and a software module generating instructions for adjustment of the environmental growing condition in or around the crop growth module of the environmentally-controlled growing chamber to the improved environmental growing condition.

In some embodiments, the control system further comprises at least one of the following: a software module configured to regulate temperature; a software module configured to regulate humidity; a software module configured to regulate gaseous or aqueous $CO_2$ or $O_2$ content; a software module configured to regulate airflow; a software module configured to regulate air pressure; a software module configured to regulate flow of water and nutrients; a software module configured to regulate aqueous nutrient concentration of an aqueous nutrient solution; a software module configured to regulate aqueous pH; a software module configured to regulate water oxidation reduction potential (ORP); a software module configured to regulate aqueous electrical conductivity (EC); a software module configured to regulate a quality or a quantity of light emission from a light source; and a software module configured to regulate movement of plant growth modules around a growing circuit, in response to the instructions. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled growing chamber in response to the instructions. In some embodiments, the vertical farming system is configured to supply water and nutrients to a crop of plants in an aqueous nutrient solution, and wherein the environmental growing conditions comprise: the temperature of the nutrient solution; the pH of the nutrient solution; the electrical conductivity of the nutrient solution; the air temperature in the controlled environment; the humidity in the controlled environment; the ambient oxygen gas concentration in the controlled environment; the ambient carbon dioxide concentration in the controlled environment; the airflow in the controlled environment; the nutrient solution flow rate; the nutrient composition of the nutrient solution; the temperature of the controlled environment; the light quality in the controlled environment; and the light intensity in the controlled environment. In some embodiments, the crop characteristic is a leaf area index of the crop plant and wherein the device comprises a digital imaging apparatus configured and positioned for measuring the leaf area index. In some embodiments, the crop characteristic is plant weight. In some embodiments, the crop characteristic is sugar content. In some embodiments, the crop characteristic is acidity. In some embodiments, the sensor is configured for placement in a sensor unit mounted in or on a second growth module, wherein the second growth module is configured to stackably support one or more other growth modules above and/or below itself within a vertical growth tower in the vertical farming system. In some embodiments, the sensor units contains a plurality of the sensors to provide environmental condition data corresponding with a sufficient quantity of the growth modules that the environmental condition for any other growth module in the system is predictable based on the provided data at a 95% confidence level. In some embodiments, the control system further comprises at least one additional sensor measuring another environmental growing condition in the environmentally-controlled growing chamber over time to generate additional environmental condition data, wherein the software module is configured for receiving the additional environmental condition data; further wherein the software module is configured for applying an algorithm to the environmental condition data, the additional environmental data, and the crop growth data to generate improved environmental growing conditions, and wherein the software module is configured for generating instructions for adjustment of the environmental growing conditions in or around the growth module in the environmentally-controlled growing chamber to the improved environmental growing conditions.

Provided herein is a computer-implemented control system for a vertical farming system, the system comprising: at least first and second crop growth modules in an environmentally-controlled vertical farming growing chamber; a device that measures a crop characteristic of a crop grown in the first crop growth module of the environmentally-controlled vertical farming growing chamber to generate crop growth data; a sensor for placement in a sensor unit mounted in or on the second crop growth module, the second crop growth module configured to permit vertical flow of an aqueous crop nutrient solution through or over itself and being configured to stackably support one or more other crop growth modules above and/or below itself, thereby forming a vertical growth tower in the vertical farming growing chamber, wherein the sensor measures an environmental growing condition in the environmentally-controlled vertical farming growing chamber over time to generate environmental condition data, further wherein the sensor unit measures data corresponding to a first environmental growing condition at a plant canopy level outside the second crop growth module over time, the first environmental growing condition selected from the group consisting of humidity, ambient carbon dioxide concentration, ambient oxygen concentration, airflow speed and temperature, further wherein the sensor unit measures data corresponding to a second environmental growing condition inside the first crop growth module over time, the second environmental growing condition comprising a characteristic of the aqueous crop nutrient solution; and a processing device comprising at least one processor, a memory, an operating system configured to perform executable instructions, and a computer program including instructions executable by the processing device to create an application comprising: a software module configured to receive the environmental condition data and the crop growth data from the environmental sensor and the measuring device; a software module configured to apply an algorithm to the environmental condition data and the crop growth data to generate an improved environmental growing condition and store the improved environmental growing condition in the memory; and a software module configured to generate and transmit instructions for adjustment of the environmental growing condition in or around the crop growth module to a subsystem of the environmentally-controlled vertical farming growing chamber to implement the improved environmental growing condition. In some embodiments, the vertical farming system is configured to supply the aqueous nutrient solution, through a nutrient supply system, to plants growing in crop growth modules stacked in the vertical growth tower, and wherein the environmental growing condition comprises: a temperature of the nutrient solution, a pH of the nutrient solution, an electrical conductivity of the nutrient solution, an air temperature in the controlled environment, a humidity in the controlled environment, an ambient oxygen gas concentration in the controlled environment, an ambient carbon dioxide concentration in the controlled environment, an airflow in the controlled environment, a nutrient solution flow rate, a nutrient composition of the nutrient solution, a temperature of the controlled environment, a light quality in the controlled environment, or a light intensity in the controlled environment. In some embodiments, the control system further comprises at least one of: a software module configured to regulate a temperature; a software module configured to regulate a humidity; a software module configured to regulate a gaseous or an aqueous $CO_2$ and/or $O_2$ content; a software module configured to regulate an airflow; a software module configured to regulate an air pressure; a software module configured to regulate a flow of water and nutrients; a software module configured to regulate an aqueous nutrient concentration of an aqueous nutrient solution; a software module configured to regulate an aqueous pH; a software module configured to regulate a water oxidation reduction potential (ORP); a software module configured to regulate an aqueous electrical conductivity (EC); a software module configured to regulate a quality or a quantity of a light emission from a light source; and a software module configured to regulate a movement of the first crop growth modules around a growing circuit; in response to the instructions. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled vertical farming growing chamber in response to the instructions. In some embodiments, the crop characteristic is plant mass. In some embodiments, the crop characteristic is sugar content. In some embodiments, the crop characteristic is acidity. In some embodiments, the control system further comprises a plurality of the sensors placed in a plurality of sensor units to provide environmental condition data corresponding with a sufficient quantity of the crop growth modules that the environmental condition for any other crop growth module in the system is predictable based on the provided data at a 95% confidence level. In some embodiments, the control system further comprises at least one additional sensor that measures another environmental growing condition in the environmentally-controlled vertical farming growing chamber over time to generate additional environmental condition data, wherein the software module is configured for receiving the additional environmental condition data from the environmental sensor and the measuring device; further wherein the software module is configured to apply an algorithm to the environmental condition data, the additional environmental data, and the crop growth data to generate improved environmental growing conditions and store the improved environmental growing conditions in the memory, and wherein the software module is configured for generating and transmitting the instructions for adjustment of the environmental growing conditions in or around the crop growth modules to a sub-system in the environmentally-controlled vertical farming growing chamber to implement the improved environmental growing conditions. In a second broad aspect provided herein is a sensor system for use in measuring two or more crop growing conditions in an environmentally controlled growth system comprising: a sensor unit configured for mounting in and/or to a first growth module within a vertical growth tower within the growth system, the growth module configured to: stackably support one or more other growth modules above and/or below itself within the vertical growth tower; permit vertical flow of an aqueous crop nutrient solution to another growth module below itself within the tower, wherein the sensor unit is further configured to, when mounted in and/or to the first growth module: measure and collect input data corresponding to a first crop growing condition at a plant canopy level outside of the growth module, and measure and collect input data corresponding to at least a second crop growing condition, wherein the first crop growing condition is selected from the group comprising humidity, ambient carbon dioxide concentration, and temperature, and wherein the second crop growing condition is a measured characteristic of the aqueous crop nutrient solution. In some embodiments, the sensor unit comprises one or more of a first temperature sensor, a $CO_2$ level sensor, and a humidity sensor. In some embodiments, the sensor system further comprises a data transmitter inside of a sensor unit housing for transmitting collected input data to a master box, wherein the master box collects, organizes and collates the received input data. In some embodiments, the sensor unit housing is water resistant, and one or more of the temperature sensor, the $CO_2$ level sensor, and the humidity sensor are configured for placement outside of the growth module and positioned to measure and collect input data corresponding to crop growing conditions at the plant canopy level outside of the growth module. In some embodiments, the sensor unit further comprises: an environmental ambient air speed sensor; an air pressure sensor; a light spectrum sensor; or any combination thereof which are configured for placement outside of the growth module and positioned to measure and collect input data corresponding to crop growing conditions at the plant canopy level outside of the growth module. In some embodiments, the sensor unit further comprises at least one of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor, configured for placement in or on the growth module and positioned to measure and collect input data corresponding to the measured characteristic of the aqueous crop nutrient solution. In some embodiments, the master box further comprises: a wireless receiver to receive transmitted input data from sensor units in the environmentally controlled growth system; a digital processing device comprising an operating system configured to perform executable instructions and a memory; a computer program including instructions executable by the digital processing device configured to collect, organize and collate the input data from the plurality of sensor units and transmits the organized and collated input data to a computer-implemented automated control system for a vertical farming system configured to monitor, analyze and adjust one or more crop growing conditions in the environmentally controlled growth environment in response to the input data; and a wireless transmitter to transmit the organized and collated input data to the automated control system. In some embodiments, the nutrient concentration sensor is adapted to measure, in the aqueous crop nutrient solution, an aqueous concentration of at least one of: zinc; molybdenum; manganese; iron; copper; chlorine; boron; sulfur; magnesium; calcium; potassium; phosphorus; and nitrogen.

Provided herein is a computer-implemented control system for a vertical farming system, the system comprising: at least first and second crop growth modules in an environmentally-controlled vertical farming growing chamber; a device that measures a crop characteristic of a crop grown in the first crop growth module of the environmentally-controlled vertical farming growing chamber to generate crop growth data; a sensor for placement in a sensor unit mounted in or on the second crop growth module, the second crop growth module configured to permit vertical flow of an aqueous crop nutrient solution through or over itself and being configured to stackably support one or more other crop growth modules above and/or below itself, thereby forming a vertical growth tower in the vertical farming growing chamber, wherein the sensor measures an environmental growing condition in the environmentally-controlled vertical farming growing chamber over time to generate environmental condition data, further wherein the sensor unit measures data corresponding to a first environmental growing condition at a plant canopy level outside the second crop growth module over time, the first environmental growing condition selected from the group consisting of humidity, ambient carbon dioxide concentration, ambient oxygen concentration, airflow speed, air pressure and temperature of the controlled environment, further wherein a sensor unit nose placed on the sensor unit is not permeable to water, and is permeable to gases, permitting passage of gases therethrough and permits insulation of carbon dioxide or other gas sensors for use in wet conditions of the environmentally-controlled vertical farming growing chamber; and a processing device comprising at least one processor, a memory, an operating system configured to perform executable instructions, and a computer program including instructions executable by the processing device to create an application comprising: a software module configured to receive the environmental condition data and the crop growth data from the environmental sensor and the measuring device; a software module configured to apply an algorithm to the environmental condition data and the crop growth data to generate an improved environmental growing condition and store the improved environmental growing condition in the memory; and a software module configured to generate and transmit instructions for adjustment of the environmental growing condition in or around the crop growth module to a sub-system of the environmentally-controlled vertical farming growing chamber to implement the improved environmental growing condition. In some embodiments, the vertical farming system is configured to supply the aqueous nutrient solution, through a nutrient supply system, to plants growing in crop growth modules stacked in the vertical growth tower, and wherein the environmental growing condition comprises: a temperature of the nutrient solution, an air temperature in the controlled environment, a humidity in the controlled environment, an ambient oxygen gas concentration in the controlled environment, an ambient carbon dioxide concentration in the controlled environment, an airflow in the controlled environment, a nutrient solution flow rate, a light quality in the controlled environment, or a light intensity in the controlled environment. In some embodiments, the control system further comprises at least one of: a software module configured to regulate a temperature; a software module configured to regulate a humidity; a software module configured to regulate a gaseous or an aqueous $CO_2$ and/or $O_2$ content; a software module configured to regulate an airflow; a software module configured to regulate an air pressure; a software module configured to regulate a flow of water and nutrients; a software module configured to regulate an aqueous nutrient concentration of an aqueous nutrient solution; a software module configured to regulate an aqueous pH; a software module configured to regulate a water oxidation reduction potential (ORP); a software module configured to regulate an aqueous electrical conductivity (EC); a software module configured to regulate a quality or a quantity of a light emission from a light source; or a software module configured to regulate a movement of the first crop growth modules around a growing circuit; in response to the instructions. In some embodiments, the sensor for placement in the sensor unit mounted in or on the second crop growth module further measures data corresponding to a second environmental growing condition inside the second crop growth module over time. In some embodiments, the second environmental growing condition comprises a characteristic of the aqueous crop nutrient solution. In some embodiments, the environmental growing condition comprises: an air temperature inside the crop growth module; a humidity inside the crop growth module; an airflow inside the crop growth module; a temperature of the aqueous nutrient solution; a pH of the aqueous nutrient solution; an electrical conductivity of the nutrient solution; a flow rate of the aqueous nutrient solution; an aqueous nutrient concentration of the aqueous nutrient solution; a pH of the aqueous nutrient solution; a dissolved $O_2$ concentration of the aqueous nutrient solution; a dissolved $CO_2$ concentration of the aqueous nutrient solution; a water oxidation reduction potential (ORP) of the aqueous nutrient solution; an electrical conductivity (EC) of the aqueous nutrient solution; or a nutrient composition of the aqueous nutrient solution. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled vertical farming growing chamber in response to the instructions.

Provided herein is a computer-implemented control system for a vertical farming system comprising: at least first and second crop growth modules in an environmentally-controlled vertical farming growing chamber, the control system operating in the vertical farming growing chamber; a sensor unit configured for mounting in or on a first crop growth module of the vertical farming system, the first crop growth module configured to permit vertical flow of an aqueous crop nutrient solution through or over itself, wherein the sensor unit measures data corresponding to a first environmental growing condition at a plant canopy level outside the first crop growth module over time, the first environmental growing condition selected from the group consisting of humidity, ambient carbon dioxide concentration, ambient oxygen concentration, airflow speed and temperature, further wherein the sensor unit measures data corresponding to a second environmental growing condition inside the first crop growth module over time, the second environmental growing condition comprising a characteristic of the aqueous crop nutrient solution; a device that measures data corresponding to a crop characteristic of crops growing in the second crop growth module; a processing device comprising at least one processor, a memory, an operating system configured to perform executable instructions, and a computer program including instructions executable by the processing device to create an application comprising: a software module configured to receive the data corresponding to the first and second environmental growing conditions and the data corresponding to the crop characteristic from the environmental sensors and the measuring device; a software module configured to apply an algorithm to the data corresponding to the first and second environmental growing conditions and the data corresponding to the crop characteristic to generate improved first and second environmental growing conditions and store the improved first and second environmental growing conditions in the memory; and a software module configured to generate and transmit instructions for adjustment of the first and second environmental growing conditions to a sub-system in the environmentally-controlled vertical farming growing chamber to implement the improved first and second environmental growing conditions. In some embodiments, the control system further comprises a software module configured to regulate at least one growing condition in response to instructions, the at least one growing condition selected from the group consisting of: a temperature; a humidity; a gaseous or an aqueous $CO_2$ or and/or $O_2$ content; an airflow speed; an air pressure; a flow rate of an aqueous nutrient solution to be supplied to crop plants growing in the crop growth modules; an aqueous nutrient concentration of the aqueous nutrient solution; a pH of the aqueous nutrient solution; a water oxidation reduction potential (ORP) of the aqueous nutrient solution; an aqueous electrical conductivity (EC) of the aqueous nutrient solution; a quality or a quantity of a light emission from a light emitting source; and a movement of the at least first and second crop growth modules around a growing circuit.

In a third broad aspect provided herein is a computer-implemented control system for a vertical farming system comprising at least first and second stacked crop growth modules and operating in an environmentally-controlled growing chamber, the control system comprising: a sensor unit configured for mounting in or on the first growth module of the vertical farming system, the first growth module configured to stack with the second growth module below itself within the vertical farming system and permit vertical flow of an aqueous crop nutrient solution to the second growth module; the sensor unit configured for measuring data corresponding to a first environmental growing condition at a plant canopy level outside the second growth module over time, the first environmental growing condition selected from the group consisting of humidity, ambient carbon dioxide concentration, and temperature; the sensor unit further configured for measuring data corresponding to a second environmental growing condition inside the first growth module over time, the second environmental growing condition a characteristic of the aqueous crop nutrient solution; a device measuring data corresponding to a crop characteristic of crops growing in the second growth module; a processing device comprising at least one processor, a memory, an operating system configured to perform executable instructions, and a computer program including instructions executable by the processing device to create an application comprising: a software module receiving the data corresponding to the first and second environmental growing conditions and the data corresponding to the crop characteristic; a software module applying an algorithm to the data corresponding to the first and second environmental growing conditions and the data corresponding to the crop characteristic to generate improved first and second environmental growing conditions; and a software module generating instructions for adjustment of the first and second environmental growing conditions in the environmentally-controlled growing chamber to the improved first and second environmental growing conditions. In some embodiments, the control system of further comprises at least one of: a software module configured to regulate temperature; a software module configured to regulate humidity; a software module configured to regulate gaseous or aqueous $CO_2$ or $O_2$ content; a software module configured to regulate airflow; a software module configured to regulate air pressure; a software module configured to regulate flow of water and nutrients; a software module configured to regulate aqueous nutrient concentration of an aqueous nutrient solution; a software module configured to regulate aqueous pH; a software module configured to regulate water oxidation reduction potential (ORP); a software module configured to regulate aqueous electrical conductivity (EC); a software module configured to regulate a quality or a quantity of light emission from a light source; and a software module configured to regulate movement of plant growth modules around a growing circuit, in response to the instructions. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled growing chamber in response to the instructions. In some embodiments, the vertical farming system is configured to supply water and nutrients to a crop of plants in an aqueous nutrient solution, and wherein the environmental growing condition comprises: temperature of the nutrient solution; pH of the nutrient solution; electrical conductivity of the nutrient solution; air temperature in the controlled environment; humidity in the controlled environment; ambient oxygen gas concentration in the controlled environment; ambient carbon dioxide concentration in the controlled environment; airflow in the controlled environment; nutrient solution flow rate; nutrient composition of the nutrient solution; temperature of the controlled environment light quality in the controlled environment; or light intensity in the controlled environment. In some embodiments, the crop characteristic is a leaf area index of the crop plant and wherein the device comprises a digital imaging apparatus configured and positioned for measuring the leaf area index. In some embodiments, the crop characteristic is plant weight. In some embodiments, the crop characteristic is sugar content. In some embodiments, the crop characteristic is acidity. In some embodiments, the sensor is configured for placement in a sensor unit mounted in or on a second growth module, wherein the second growth module is configured to stackably support one or more other growth modules above and/or below itself within a vertical growth tower in the vertical farming system. In some embodiments, the control system further comprises a plurality of the sensors placed in the sensor units to provide environmental condition data corresponding with a sufficient quantity of the growth modules that the environmental condition for any other growth module in the system is predictable based on the provided data at a 95% confidence level. In some embodiments, the control system further comprises at least one additional sensor measuring another environmental growing condition in the environmentally-controlled growing chamber over time to generate additional environmental condition data, wherein the software module is configured for receiving the additional environmental condition data; further wherein the software module is configured for applying an algorithm to the environmental condition data, the additional environmental data, and the crop growth data to generate improved environmental growing conditions, and wherein the software module is configured for generating instructions for adjustment of the environmental growing conditions in or around the growth module in the environmentally-controlled growing chamber to the improved environmental growing conditions. In some embodiments, the sensor unit further comprises one or more of a first temperature sensor, a $CO_2$ level sensor, and a humidity sensor. In some embodiments, the sensor system further comprises a data transmitter inside of a sensor unit housing for transmitting collected input data to a master box, wherein the master box collects, organizes and collates the received input data. In some embodiments, the sensor unit housing is water resistant, and one or more of the temperature sensor, the $CO_2$ level sensor, and the humidity sensor are configured for placement outside of the growth module and positioned to measure and collect input data corresponding to crop growing conditions at the plant canopy level outside of the growth module. In some embodiments, the sensor unit further comprises an environmental ambient air speed sensor; an air pressure sensor; a light spectrum sensor; or any combination thereof configured for placement outside of the growth module and positioned to measure and collect input data corresponding to crop growing conditions at the plant canopy level outside of the growth module. In some embodiments, the sensor unit further comprises at least one of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor, configured for placement in or on the growth module and positioned to measure and collect input data corresponding to the measured characteristic of the aqueous crop nutrient solution. In some embodiments, the master box further comprises: a wireless receiver to receive transmitted input data from sensor units in the environmentally controlled growth system; a digital processing device comprising an operating system configured to perform executable instructions and a memory; a computer program including instructions executable by the digital processing device configured to collect, organize and collate the input data from the plurality of sensor units and transmits the organized and collated input data to a computer-implemented automated control system for a vertical farming system configured to monitor, analyze and adjust one or more crop growing conditions in the environmentally controlled growth environment in response to the input data; and a wireless transmitter to transmit the organized and collated input data to the automated control system. In some embodiments, the nutrient concentration sensor is adapted to measure, in the aqueous crop nutrient solution, an aqueous concentration of at least one of: zinc; molybdenum; manganese; iron; copper; chlorine; boron; sulfur; magnesium; calcium; potassium; phosphorus; and nitrogen.

In a fourth broad aspect, provided herein is a computer-implemented method for operating a control system for a vertical farming system comprising at least a first crop growth module and operating in an environmentally-controlled growing chamber, the method comprising: training a machine learning algorithm to identify a plurality of recommended environmental growing conditions for a crop growing in the crop growth module of the vertical farming system by providing historic environmental growing condition data and crop growth data; receiving real-time data from a plurality of sensors, each sensor measuring an environmental growing condition in the environmentally-controlled growing chamber; receiving real-time data from a device, the device measuring a crop characteristic of the crop growing in the crop growth module of the vertical farming system; and applying the trained machine learning algorithm to the real-time data from the plurality of sensors and the real-time data from the device to generate instructions for adjustment of each of the environmental growing conditions in the environmentally-controlled growing chamber to the recommended environmental growing conditions. In some embodiments, the vertical farming system is configured to supply water and nutrients to a crop of plants in an aqueous nutrient solution, and wherein the environmental growing condition comprises: temperature of the nutrient solution, pH of the nutrient solution, electrical conductivity of the nutrient solution, air temperature in the controlled environment, humidity in the controlled environment, ambient oxygen gas concentration in the controlled environment, ambient carbon dioxide concentration in the controlled environment, airflow in the controlled environment, nutrient solution flow rate, nutrient composition of the nutrient solution, temperature of the controlled environment light quality in the controlled environment, or light intensity in the controlled environment. In some embodiments, the crop characteristic is a leaf area index of the crop plant and wherein the device comprises a digital imaging apparatus configured and positioned for measuring the leaf area index. In some embodiments, the crop characteristic is plant weight. In some embodiments, the crop characteristic is sugar content. In some embodiments, the crop characteristic is acidity. In some embodiments, the sensors are configured for placement in one or more sensor units mounted in or on growth modules, wherein each growth module is configured to stackably support one or more other growth modules above and/or below itself within a vertical growth tower in the vertical farming system. In some embodiments, the sensors comprise one or more of a first temperature sensor, a $CO_2$ level sensor, and a humidity sensor. In some embodiments, wherein the sensors comprise a nutrient concentration sensor adapted to measure, in an aqueous crop nutrient solution, an aqueous concentration of at least one of: zinc; molybdenum; manganese; iron; copper; chlorine; boron; sulfur; magnesium; calcium; potassium; phosphorus; and nitrogen. In some embodiments, the sensors in the one or more sensor units mounted in or on growth modules, provide environmental condition data corresponding with a sufficient quantity of the growth modules that the environmental condition for any other growth module in the system is predictable based on the provided data at a 95% confidence level.

Provided herein is a computer-implemented method for operating a control system for a vertical farming system comprising at least a first crop growth module and operating in an environmentally-controlled vertical farming growing chamber, the method comprising: training a machine learning algorithm to identify a plurality of recommended environmental growing conditions for a crop growing in the crop growth module of the vertical farming system by providing historic environmental growing condition data and crop growth data; receiving real-time data from a plurality of sensors, each sensor measuring an environmental growing condition in the environmentally-controlled vertical farming growing chamber; receiving real-time data from a device, the device measuring a crop characteristic of the crop growing in the crop growth module of the vertical farming system; and applying the trained machine learning algorithm to the real-time data from the plurality of sensors and the real-time data from the measuring device to generate instructions for adjustment of each of the environmental growing conditions in the environmentally-controlled vertical farming growing chamber to the recommended environmental growing conditions. In some embodiments, of the method, the vertical farming system is configured to supply water and nutrients to a crop of plants, through a nutrient supply system, in response to the environmental condition data measured by the sensor, in an aqueous nutrient solution, and wherein the environmental growing condition comprises: a temperature of the nutrient solution, a pH of the nutrient solution, an electrical conductivity of the nutrient solution, an air temperature in the controlled environment, a humidity in the controlled environment, an ambient oxygen gas concentration in the controlled environment, an ambient carbon dioxide concentration in the controlled environment, an airflow in the controlled environment, a nutrient solution flow rate, a nutrient composition of the nutrient solution, a temperature of the controlled environment, a light quality in the controlled environment, or a light intensity in the controlled environment.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figures 1A, 1B:
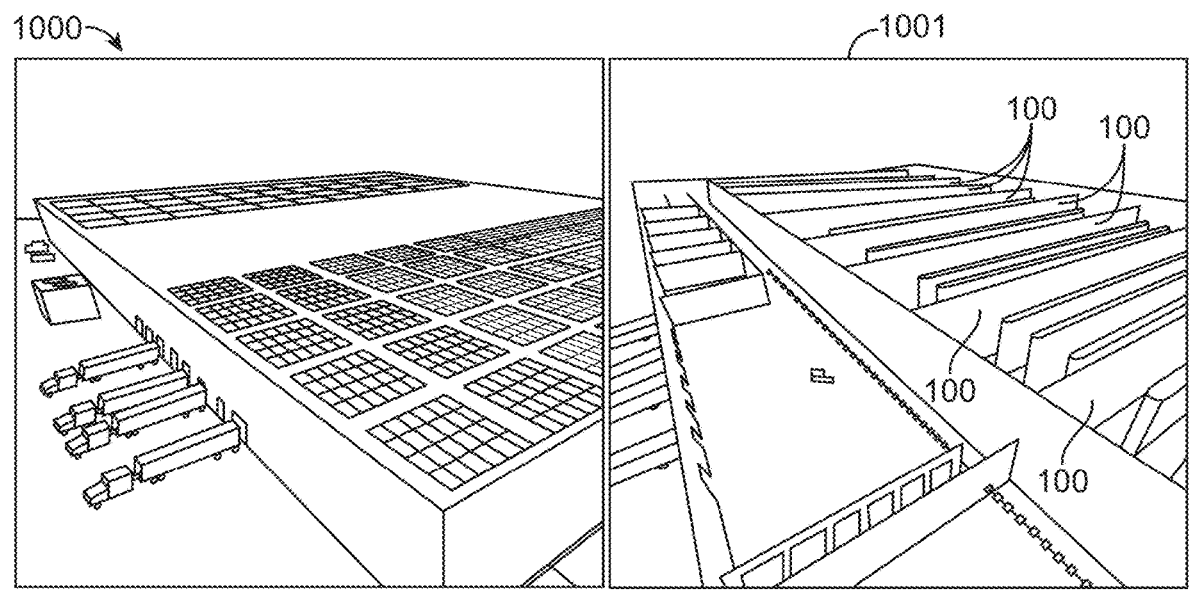
FIG. 1A is an illustrative isometric exterior view of a production farming facility comprising environmentally controlled growing chambers with multi-stage vertical growth systems therein.
FIG. 1B is an illustrative isometric exterior cut-away view of a production farming facility comprising environmentally controlled growing chambers with multi-stage vertical growth systems therein.

Among those technology advancements is the application of new control systems 600 capable of machine learning, or artificial intelligence, capable of assimilating thousands or even millions of data points acquired by strategically placed sensors 615 during the course of a growing cycle or multiple growing cycles, and further capable of automatically adjusting the growth conditions 610 for a crop 20 on a year-round basis within the controlled environment such as lighting 108, fertilizers (nutrients), moisture, gas levels, temperature, air flow, and ultimately, packaging to produce higher yields at a lower cost per square foot, with reduced overall losses per planted crop, better nutritional value, visual appeal and faster growth cycles.

Combining advances in agriculture with the increasing technological advances of industry acquired since the industrial revolution and more recently, the concept of assembly line automation, the inventors herein have conceived a vertical farming structure 101 in a controlled environment 100, 1000, 1001 having columns comprising automated hydroponic plant growth modules 104, capable of being moved about an automated conveyance system 200(*a/b*) in a carousel fashion, exposed to controlled lighting 108, airflow provided by an airflow source 400 and humidity, with ideal nutritional support provided by a nutrient supply system 300.

As used herein, machine learning or artificial intelligence means intelligence exhibited by machines. In computer science, an ideal "intelligent" machine is a flexible rational agent that perceives its environment and takes actions that maximize its chance of success at some goal. Colloquially, the term "artificial intelligence" is applied when a machine mimics "cognitive" functions that humans associate with other human minds, such as "learning" and "problem solving". As machines become increasingly capable, facilities once thought to require intelligence are removed from the definition. For example, optical character recognition is no longer perceived as an exemplar of "artificial intelligence" having become a routine technology. Capabilities still classified as AI include advanced Chess and Go systems and self-driving cars. The central problems (or goals) of AI research include reasoning, knowledge, planning, learning, natural language processing (communication), perception and the ability to move and manipulate objects. General intelligence is among the field's long-term goals. Approaches include statistical methods, computational intelligence, soft computing (e.g. machine learning), and traditional symbolic AI. Many tools are used in AI, including versions of search and mathematical optimization, logic, methods based on probability and economics. The AI field draws upon computer science, mathematics, psychology, linguistics, philosophy, neuroscience and artificial psychology.

The AI system herein comprises various sensors and circuit boards that optionally include a Raspberry Pi (a series of credit card-sized single-board computers) or Arduinos (an open-source prototyping platform) that either through wifi, radio frequency, wires, or other mechanism communicate to a server that can store data in the cloud, or a hard drive, or in a data historian. Humans may play some role in the form of gathering, analyzing, or manipulating this data.

With environmental data such as oxygen levels, humidity, temperature, light penetration, airflow etc. and data points on the crop cycle such as yield, taste, plant health, nutrient intake, etc., the learning possibilities are expanded significantly. Compounding this data within improved horticultural knowledge now makes it possible to attain up to approximately 33 crop cycles in a year per vertical carousel, versus one or two typical growing seasons in outdoor agriculture or approximately eight growing cycles in some greenhouse environments.

Those of skill will recognize that the various illustrative logical blocks, modules, circuits, and algorithm steps described in connection with the embodiments disclosed herein, including with reference to the control systems described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a Raspberry PI further comprising Arduinos, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, a controller for use of control of the IVT comprises a processor (not shown).

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Digital Processing Device

In some embodiments, the Automated Control System and or the Master Control System for the multi-stage, automated growth system described herein includes a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the Automated Control System and or the Master Control System for the multi-stage, automated growth system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the Automated Control System and or the Master Control System for the multi-stage, automated growth system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis.

The term "axial" as used here refers to a direction or position along an axis that is parallel to a main or longitudinal axis. For clarity and conciseness, at times similar components labeled similarly (for example, axis 1011A and axis 1011B) will be referred to collectively by a single label (for example, axis 1011).

As used herein, and unless otherwise specified, the term "anterior" means the front surface of an apparatus or structure; often used to indicate the position of one structure relative to another, that is, situated nearer the front part of an apparatus or structure.

As used herein, and unless otherwise specified, the term "posterior" means the back surface of an apparatus or structure; Often used to indicate the position of one structure relative to another, that is, nearer the back of an apparatus or structure.

As used herein, and unless otherwise specified, the term "superior" refers to an apparatus or structure and means situated above or nearer the vertex of the head in relation to a specific reference point; opposite of inferior. It may also mean situated above or directed upward.

As used herein, and unless otherwise specified, the term "inferior" refers to an apparatus or structure and means situated nearer the soles of the feet in relation to a specific reference point; opposite of superior. It may also mean situated below or directed downward.

As used herein, and unless otherwise specified, the term "lateral" means denoting a position farther from the median plane or midline of an apparatus or a structure. It may also mean "pertaining to a side".

As used herein and unless otherwise specified, the term "medial" means, situated toward the median plane or midline of an apparatus or structure.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

As used herein, the term "vertical growth assembly" means a tower assembly comprising a plurality of growth modules, or alternately means a vertical column or vertical growth column comprising a plurality of growth modules. The tower assembly comprises either a supported tower or an unsupported, self-standing tower. The vertical column typically comprises a vertical support member having a plurality of growth modules affixed thereto. The vertical support member may affix to an outer edge of a growth module container or through an interior portion thereof.

As used herein, "light intensity" refers to or photosynthetically active radiation [PAR] or photosynthetic photon flux density (PPFD). PPFD is a measured metric whereas PAR is a descriptive term for a range of wavelengths.

Control and Sensor Systems of the Present Disclosure

In a first broad aspect, provided herein is a computer-implemented control system for a vertical farming system 1000, 1001. The vertical farming system includes a plurality of vertical growth systems 101 in an environmentally-controlled growing chamber 100, for example a greenhouse. FIGS. 1A and 1B depict external and cut-away views of exemplary facilities with growing chambers for use with control systems of the present disclosure. The control system includes a sensor or group of sensors 615, which measures one or more environmental growing conditions 610 in the environmentally-controlled growing chamber over time to generate corresponding environmental condition data 645. The sensor(s) 615 is, for example, an air temperature sensor, a humidity sensor, or a sensor for measuring gaseous carbon dioxide content. The sensor(s) may also sense numerous other environmental conditions, including air pressure, air flow, gaseous oxygen content, light quality (e.g.: spectral properties of natural or artificial light), and/or light quantity (e.g.: light intensity or length of light/dark cycles). Alternatively or additionally, the sensor(s) may measure one or more properties of an aqueous nutrient solution which may be provided to crops growing in the vertical farming system, for example in a hydroponic vertical farming system. These properties may include temperature, dissolved oxygen and/or carbon dioxide content, nutrient content (e.g.: content of one or more of zinc, molybdenum, manganese, iron, copper, chlorine, boron, sulfur, magnesium, calcium, potassium, phosphorus, and nitrogen), pH, oxygen reduction potential, or electrical conductivity. In addition or alternatively, the sensor may also sense a rate of movement of growing plants, for example as such plants are moved up or down a vertical growth tower, and/or around a growing circuit in the vertical farming system. In some systems, the sensor may be part of a sensor array 30, suitable for measuring any combination of environmental growing conditions 610, including any possible combination of the conditions described in this paragraph. An exemplary sensor is depicted at FIGS. 11A, 11B, 11C, 12A and 12B, adapted for placement in the plant growth module, spacer module or sensor module 104/105/110 depicted in FIGS. 5A, 5B, 6A and 6B.

As depicted in FIGS. 11A, 11B, 11C, 12A and 12B, the sensor system comprises a sensor module 110, a sensor circuit board 31, a sensor mounting port 32, a sensor battery pack 33, a sensor nose mount 34, a sensor nose 35, a sensor circuit mounting board 37 configurable for mounting a sensor 615 (not shown) or a crop characteristic measuring device 625 (not shown) and a digital imaging device/crop characteristic device mounting port 38.

The sensor and/or sensor array measures the environmental growing condition(s) continually, or at intervals during the growing cycle of the crop plant grown in the vertical farming system. The environmental growing condition data generated by the sensor or sensor array may, for example, provide a "fingerprint" corresponding to one or more environmental conditions experienced by a growing crop plant over time over the course of its growth, for example up until the time of harvest. Alternatively, the data may correspond with only two or more time points during the course of the plant's growth cycle.

In some embodiments, the sub-system is selected from the group consisting of: a lighting control sub-system (not shown); a HVAC control sub-system (not shown); a nutrient supply control sub-system (not shown); a conveyance control sub-system (not shown); and a vertical lift mechanism control sub-system (not shown).

The vertical farming system also includes one or more devices 625 for measuring a quantifiable crop characteristic of a crop grown in the growth module, to generate corresponding crop growth data 645. The device may be a digital imaging device, such as a digital camera, suitable for capturing images of growing crop plants which may be used for generating measurements of leaf area index (LAI). The device may also be for measuring the weight, sugar content, water content, acidity, or other properties of the crop plant. The device(s) may generate crop characteristic data corresponding with any one or more of the measured quantifiable crop characteristic(s). The device may be positionable within the vertical farming system such that it may measure the quantifiable characteristic during plant growth, and/or after harvest. For example, a digital imaging apparatus may be stationary, and positioned such that it captures digital images of crop plants as they pass by while travelling around a growth circuit. Alternatively, the apparatus may be mounted to a drone which flies about the vertical farming system capturing images of growing plants.

Figure 10A:
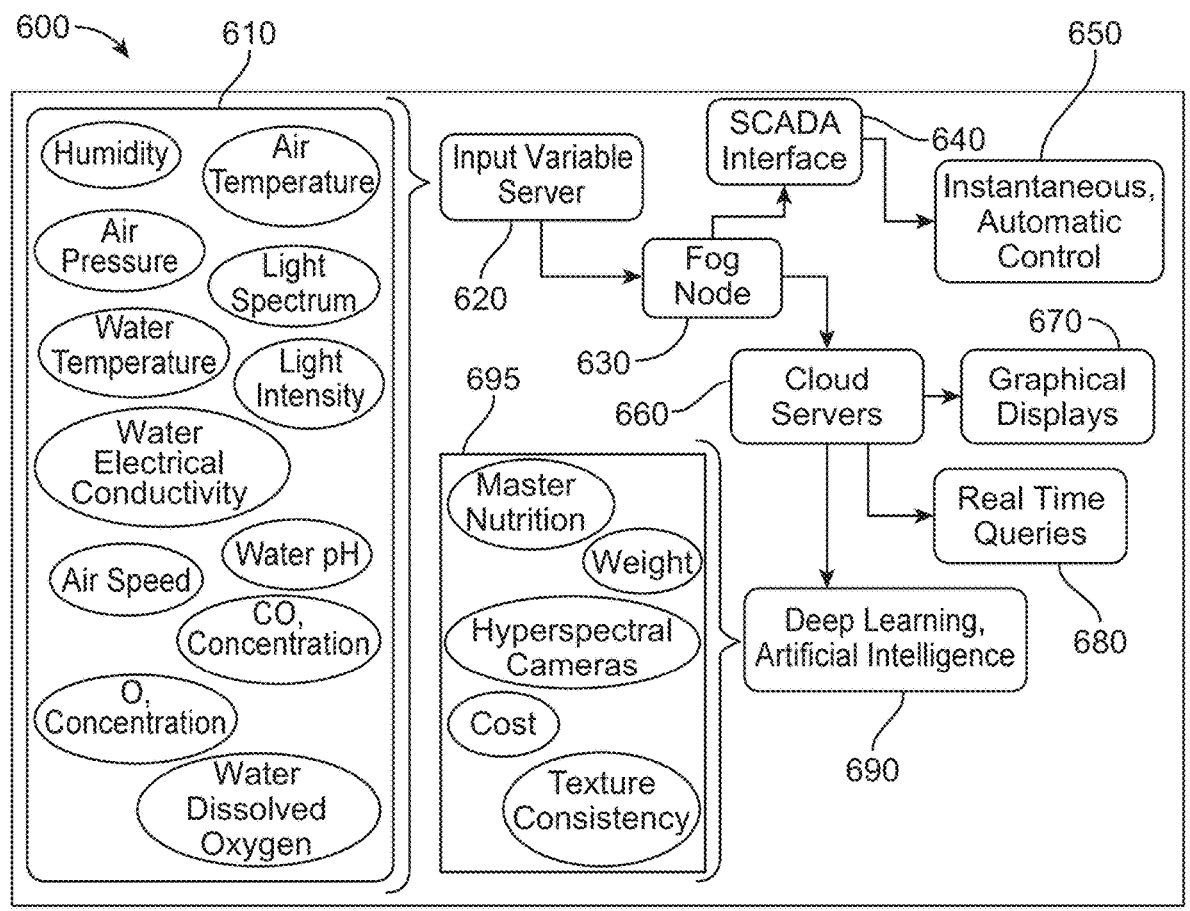
FIG. 10A is an illustrative schematic of the machine learning capability and system controls associated with the automated master control system.
Figure 10B:
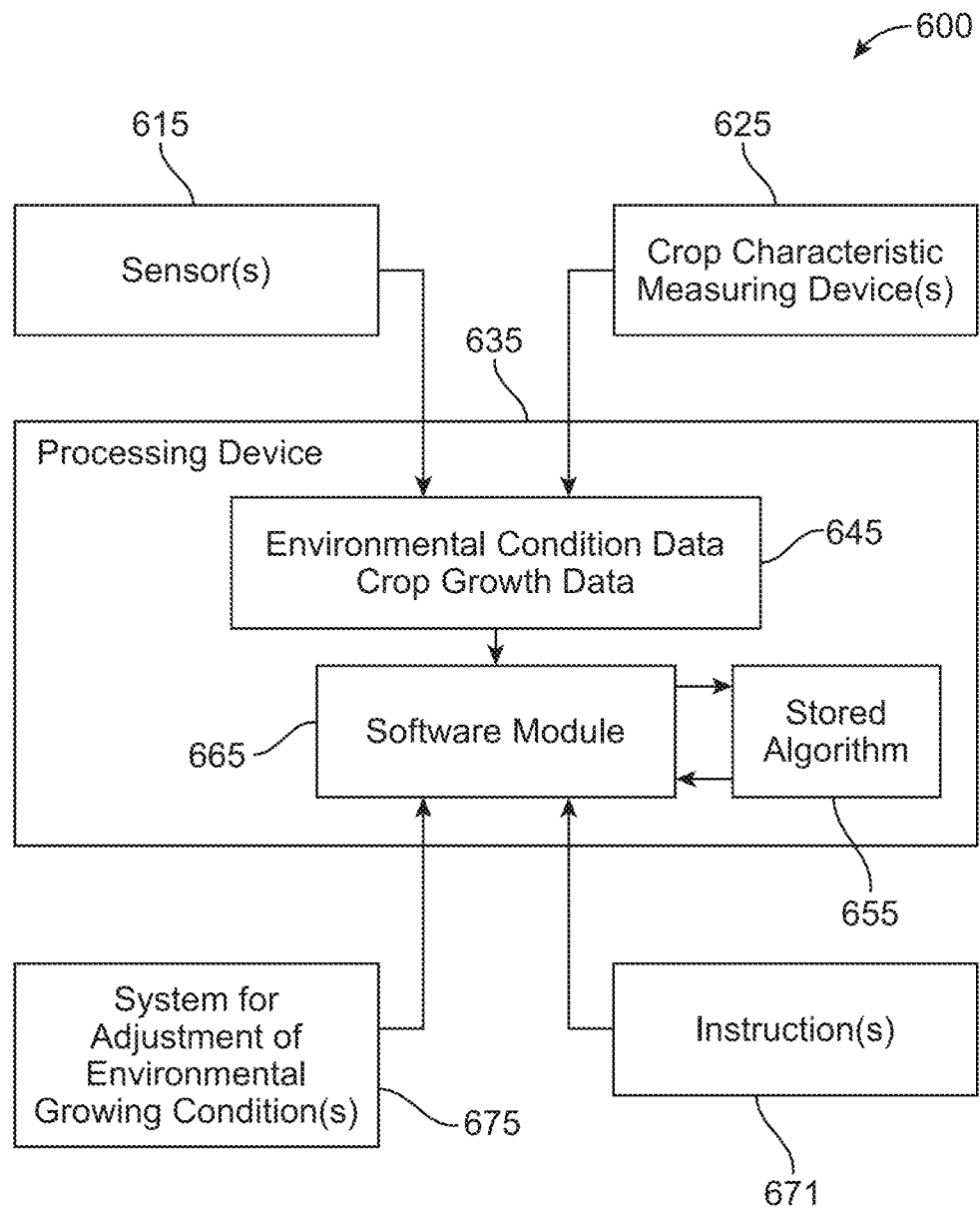
FIG. 10B is an illustrative schematic of a control system configured for automatic and routine manual inputs of commands to control the environmental growing conditions of the growing chamber.
Figure 10C:
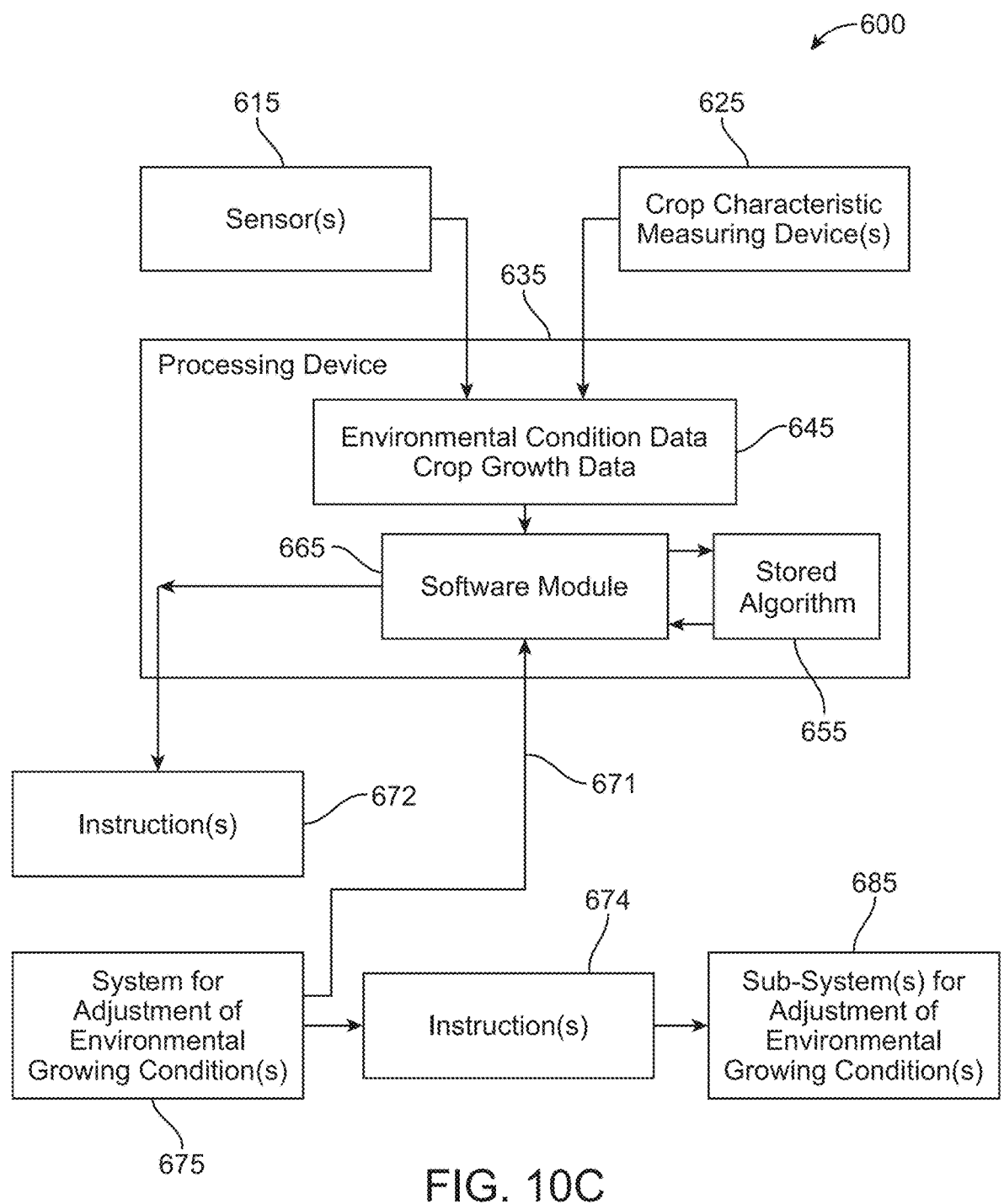
FIG. 10C is an illustrative schematic of a control system configured for full automated control of the environmental growing conditions of the growing chamber by an artificial intelligence-controlled software module, not requiring routine manual inputs.
Figure 11A:
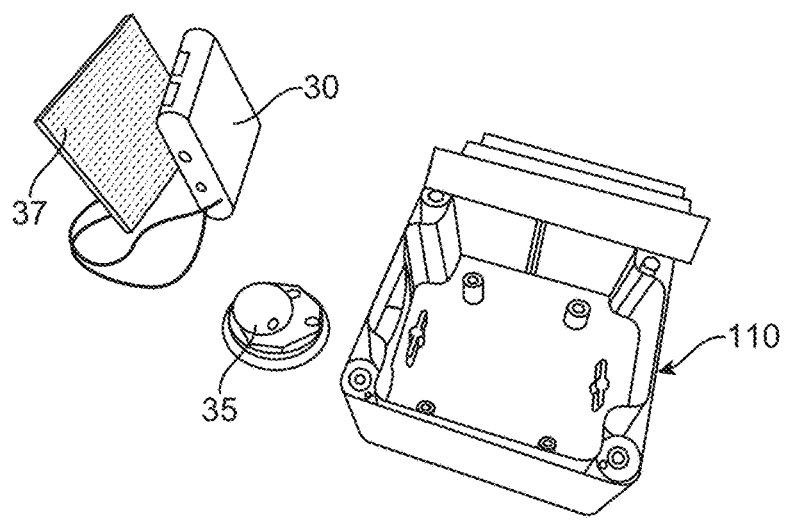
FIG. 11A is an illustrative top view of a growth module configured for containing a sensor unit including sensors for sensing one or more environmental growing conditions.
Figure 11B:
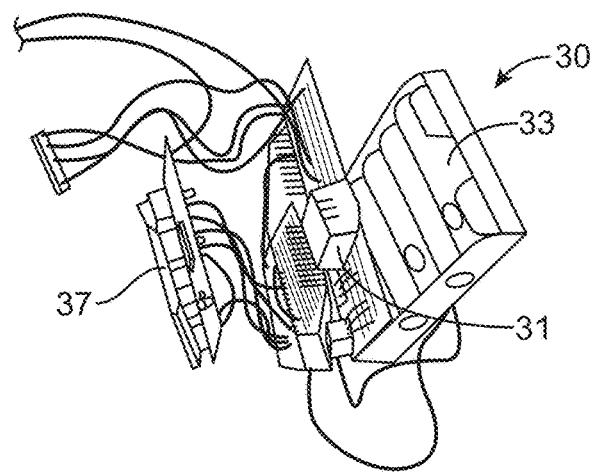
FIG. 11B is an illustrative view of a sensor unit including sensors for sensing one or more environmental growing conditions.
Figure 11C:
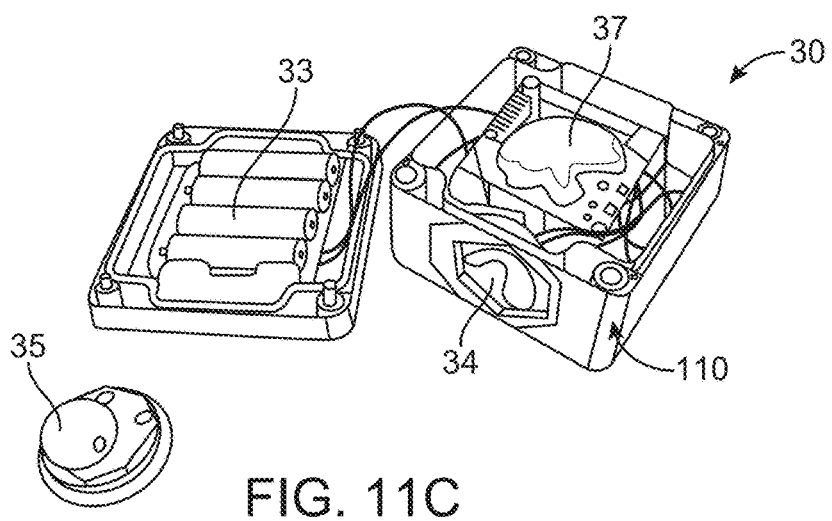
FIG. 11C is an illustrative view of a growth module containing a sensor unit including sensors for sensing one or more environmental growing conditions.

As illustrated in FIGS. 10A-10C, the vertical farming system control system 600 also includes a processing device 635, which includes a processor, a memory, an operating system configured to perform executable instructions, and a computer program including instructions executable by the processing device to create an application comprising: a software module 665 configured for receiving the environmental condition data and the crop growth data from the environmental sensor or sensor array 615, 30 and the measuring device 625; a software module configured to apply an algorithm 655 to the environmental growing condition data 610 and the crop growth data to generate an improved environmental growing condition; and a software module configured to generate and transmit instructions 671/672/674 for adjustment of the environmental growing condition in or around the hydroponic plant growth module to a sub-system 675/685 of the environmentally-controlled growing chamber to implement the improved environmental growing condition.

The processing device may also include a receiver, for receiving transmitted data, and/or a transmitter, for transmitting data. The receiver and transmitter (not shown) may be configured for wired, and/or wireless receipt or transmission of data. The computer program includes instructions which may be executed by the processing device to create an application. The application includes a software module 665, which is configured to receive environmental condition data generated by the sensor(s), and crop characteristic data generated by the device(s). It also includes a software module that applies an algorithm 655 to the environmental condition data generated by the sensor(s), and to the crop characteristic data generated by the device(s). By application of the algorithm, one or more improved environmental growing condition(s) are generated. The processing device also includes a software module that generates instructions for adjustment of the environmental growing condition(s) in or around the crop growth module to the improved environmental growing condition.

In a simple and non-limiting example, the algorithm may be applied to data corresponding with a particular air temperature over the course of a crop's growing cycle, which represents an increase over a previous measured air temperature, and data corresponding to the crop's leaf area index, which represents an increase over the leaf area index of a crop grown under the previously measured air temperature conditions. In such a case, the newly measured temperature would represent an improved environmental growing condition. The software module would then generate instructions for adjusting the temperature in or around the crop growing module. The temperature could then be adjusted, either automatically, or with human intervention. Some control systems may be configured to automatically monitor and adjust the growing condition(s) in response to the instructions.

In other examples, the measured crop characteristic may represent a decrease in leaf area index, and instructions would be generated for adjusting the temperature back to the previously measured temperature, corresponding with a larger leaf area index. In some examples, a plurality of two, three, or four or more environmental conditions would be measured over time during the crop cycle, and application of the algorithm to data corresponding with this combination of measured environmental conditions would generate improved growing conditions for each of the measured conditions. For example, instructions for adjustment to improved levels of any combination of air temperature, humidity, gaseous carbon dioxide, and/or any combination of characteristics of an aqueous nutrient solution may be generated.

The control system may include one or more software modules configured for regulating one or more of temperature, humidity, gaseous or aqueous $CO_2$ or $O_2$ content, airflow, air pressure, flow of water and nutrients, aqueous nutrient concentration of an aqueous nutrient solution, aqueous pH, water or aqueous oxidation reduction potential (ORP), aqueous electrical conductivity (EC), a quality or a quantity of light emission from a light source, and movement of plant growth modules around a growing circuit.

In some embodiments, as illustrated in FIG. 10A, the computer control system or master control system 600, comprises: an input variable server 620, a Fog Node 630, a SCADA interface 640 to provide instantaneous automatic control 650, Cloud Servers 660, Graphical Displays 670, the ability to accommodate and provide Real Time Queries 680 and software systems providing Deep Learning, Artificial Intelligence programming 690. When properly programmed and combined the master control system 600 monitors growth conditions 610 of the enclosed production farming facility 1000, 1001, the growth chambers 100 and individual hydroponic plant growth modules 104 in each vertical growth system 101, analyzing the input data from the monitored growth conditions 610 provided by the sensors 615 and crop characteristic measuring devices 625, sent to the sensor arrays 30 and subsequently transmitted to the master control system 600 for processing. Once this data is collected and analyzed, the master control system 600 is configured, through Deep Learning, Artificial Intelligence programming 690, to adjust growth conditions by sending out new instructions 671, 672, 674 to the various environmental control systems 675, 685 and nutrient control systems 300 in order to improve and continually optimize the output characteristics 695 of the crop.

In some embodiments of the plant growing systems the output characteristics 695 of the crop comprise nutrition levels, weight, growth (manufacturing/production) costs, color or appearance, flavor and/or texture.

The sensor(s) may be configured for placement in a sensor unit 110, which itself is configurable for placement in a separate growth module 104 or a sensor module 105, which may or may not include a growing plant therein. This second "dummy" growth module 105, to (and/or inside of) which the sensor is mounted, may be configured to stackably support other growth modules above or below itself within a vertical growth tower, all within the vertical growth system.

In some examples, numerous sensors are distributed about the environmentally-controlled growing chamber 100 to provide environmental data 610 corresponding with their individual positions. In some examples, sensors 615 are distributed about one or more vertical growth towers, each corresponding with a position of a growth module within the growth tower. In preferred examples, a sufficient number of sensors is used such that environmental data (corresponding with one or more environmental condition(s) generated by this plurality of sensors such that the environmental condition(s) at any position within the tower (or within the system) may be predicted with 95% statistical confidence.

Provided herein is a computer-implemented control system for a vertical farming system, the system comprising: at least first and second crop growth modules 104 in an environmentally-controlled vertical farming growing chamber 100; a device that measures a crop characteristic 625 of a crop 20 grown in the first crop growth module of the environmentally-controlled vertical farming growing chamber to generate crop growth data 645; a sensor 615 for placement in a sensor unit 110 mounted in or on the second crop growth module, the second crop growth module configured to permit vertical flow of an aqueous crop nutrient solution through or over itself and being configured to stackably support one or more other crop growth modules above and/or below itself, thereby forming a vertical growth tower 102 in the vertical farming growing chamber 100, wherein the sensor 615, 30 measures an environmental growing condition 610 in the environmentally-controlled vertical farming growing chamber 100 over time to generate environmental condition data 645, further wherein the sensor unit 110 measures data corresponding to a first environmental growing condition at a plant canopy level outside the second crop growth module over time, the first environmental growing condition 610 selected from the group consisting of humidity, ambient carbon dioxide concentration, ambient oxygen concentration, airflow speed and temperature, further wherein the sensor unit measures data corresponding to a second environmental growing condition inside the first crop growth module over time, the second environmental growing condition 610 comprising a characteristic of the aqueous crop nutrient solution. One of skill in the art will appreciate that the control system and the sensors are calibrated such that data from either the first or the second environmental condition, collected from either the first or second growth module is considered to be representative of either the first or second environmental condition. The control system further comprises a processing device 635 comprising at least one processor, a memory, an operating system configured to perform executable instructions, and a computer program including instructions executable by the processing device to create an application comprising: a software module 655 configured to receive the environmental condition data and the crop growth data from the environmental sensor and the measuring device; a software module configured to apply an algorithm 655 to the environmental condition data and the crop growth data to generate an improved environmental growing condition and store the improved environmental growing condition in the memory; and a software module configured to generate and transmit instructions for adjustment of the environmental growing condition in or around the crop growth module to a sub-system of the environmentally-controlled vertical farming growing chamber to implement the improved environmental growing condition. In some embodiments, the vertical farming system is configured to supply the aqueous nutrient solution, through a nutrient supply system 300, to plants growing in crop growth modules stacked in the vertical growth tower, and wherein the environmental growing condition comprises: a temperature of the nutrient solution, a pH of the nutrient solution, an electrical conductivity of the nutrient solution, an air temperature in the controlled environment, a humidity in the controlled environment, an ambient oxygen gas concentration in the controlled environment, an ambient carbon dioxide concentration in the controlled environment, an airflow in the controlled environment, a nutrient solution flow rate, a nutrient composition of the nutrient solution, a temperature of the controlled environment, a light quality in the controlled environment, or a light intensity in the controlled environment.

Figure 9:
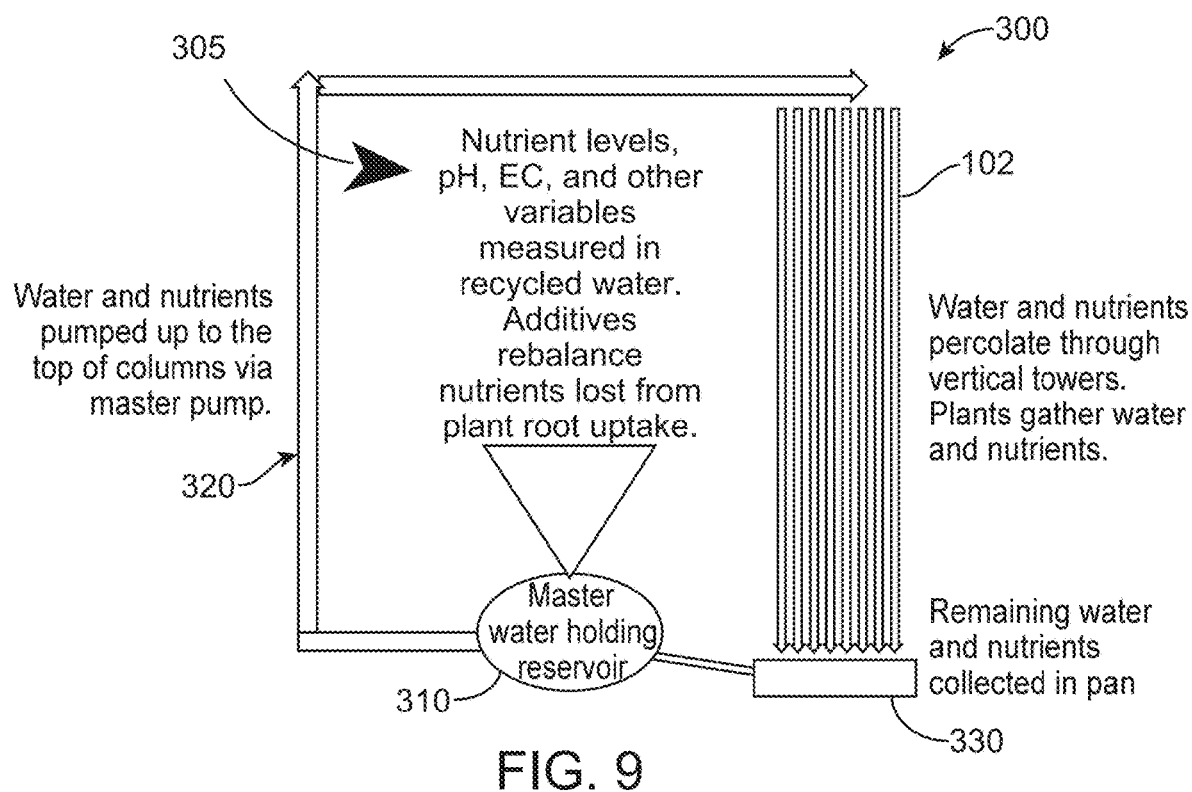
FIG. 9 is an illustrative schematic of a gravity-feed water and nutrient supply system supporting the vertical farming system.

In some embodiments, the nutrient supply system 300, such as the non-limiting system illustrated in FIG. 9, is configured to direct the aqueous crop nutrient solution from a master water reservoir 310, pumped up to the tops of the vertical growth columns via a pump and piping system 320, and distributed through the upper opening of the hydroponic plant growth module when mounted to the vertical growth column 102, in a controlled flow, allowing the water and nutrients 305 to percolate through the hydroponic plant growth modules located on each vertical growth column. Optionally, additional distribution points at lower points along the vertical column may also be utilized for secondary distribution of water with balanced nutrient levels to account for losses and absorption in the hydroponic plant growth modules above. Once the water and nutrients 305 complete the vertical traverse, the remaining water and nutrients that leave the lowest hydroponic plant growth module is collected in a pan 330, recycled to the master water reservoir 330 where the nutrient levels are automatically analyzed and again replenished to optimal levels before repeating the cycle.

In some embodiments, the control system further comprises at least one of: a software module configured to regulate a temperature; a software module configured to regulate a humidity; a software module configured to regulate a gaseous or an aqueous $CO_2$ and/or $O_2$ content; a software module configured to regulate an airflow; a software module configured to regulate an air pressure; a software module configured to regulate a flow of water and nutrients; a software module configured to regulate an aqueous nutrient concentration of an aqueous nutrient solution; a software module configured to regulate an aqueous pH; a software module configured to regulate a water oxidation reduction potential (ORP); a software module configured to regulate an aqueous electrical conductivity (EC); a software module configured to regulate a quality or a quantity of a light emission from a light source; and a software module configured to regulate a movement of the first crop growth modules around a growing circuit; in response to the instructions. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled vertical farming growing chamber in response to the instructions. In some embodiments, the crop characteristic is plant mass. In some embodiments, the crop characteristic is sugar content. In some embodiments, the crop characteristic is acidity. In some embodiments, the control system further comprises a plurality of the sensors placed in a plurality of sensor units to provide environmental condition data corresponding with a sufficient quantity of the crop growth modules that the environmental condition for any other crop growth module in the system is predictable based on the provided data at a 95% confidence level. In some embodiments, the control system further comprises at least one additional sensor that measures another environmental growing condition in the environmentally-controlled vertical farming growing chamber over time to generate additional environmental condition data, wherein the software module is configured for receiving the additional environmental condition data from the environmental sensor and the measuring device; further wherein the software module is configured to apply an algorithm to the environmental condition data, the additional environmental data, and the crop growth data to generate improved environmental growing conditions and store the improved environmental growing conditions in the memory, and wherein the software module is configured for generating and transmitting the instructions for adjustment of the environmental growing conditions in or around the crop growth modules to a sub-system in the environmentally-controlled vertical farming growing chamber to implement the improved environmental growing conditions.

Provided herein is a computer-implemented control system for a vertical farming system, the system comprising: at least first and second crop growth modules in an environmentally-controlled vertical farming growing chamber; a device that measures a crop characteristic of a crop grown in the first crop growth module of the environmentally-controlled vertical farming growing chamber to generate crop growth data; a sensor for placement in a sensor unit mounted in or on the second crop growth module, the second crop growth module configured to permit vertical flow of an aqueous crop nutrient solution through or over itself and being configured to stackably support one or more other crop growth modules above and/or below itself, thereby forming a vertical growth tower in the vertical farming growing chamber, wherein the sensor measures an environmental growing condition in the environmentally-controlled vertical farming growing chamber over time to generate environmental condition data, further wherein the sensor unit measures data corresponding to a first environmental growing condition at a plant canopy level outside the second crop growth module over time, the first environmental growing condition selected from the group consisting of humidity, ambient carbon dioxide concentration, ambient oxygen concentration, airflow speed, air pressure and temperature of the controlled environment, further wherein a sensor unit nose placed on the sensor unit is not permeable to water, and is permeable to gases, permitting passage of gases therethrough and permits insulation of carbon dioxide or other gas sensors for use in wet conditions of the environmentally-controlled vertical farming growing chamber; and a processing device comprising at least one processor, a memory, an operating system configured to perform executable instructions, and a computer program including instructions executable by the processing device to create an application comprising: a software module configured to receive the environmental condition data and the crop growth data from the environmental sensor and the measuring device; a software module configured to apply an algorithm to the environmental condition data and the crop growth data to generate an improved environmental growing condition and store the improved environmental growing condition in the memory; and a software module configured to generate and transmit instructions for adjustment of the environmental growing condition in or around the crop growth module to a sub-system of the environmentally-controlled vertical farming growing chamber to implement the improved environmental growing condition. In some embodiments, the vertical farming system is configured to supply the aqueous nutrient solution, through a nutrient supply system, to plants growing in crop growth modules stacked in the vertical growth tower, and wherein the environmental growing condition comprises: a temperature of the nutrient solution, an air temperature in the controlled environment, a humidity in the controlled environment, an ambient oxygen gas concentration in the controlled environment, an ambient carbon dioxide concentration in the controlled environment, an airflow in the controlled environment, a nutrient solution flow rate, a light quality in the controlled environment, or a light intensity in the controlled environment. In some embodiments, the control system further comprises at least one of: a software module configured to regulate a temperature; a software module configured to regulate a humidity; a software module configured to regulate a gaseous or an aqueous $CO_2$ and/or $O_2$ content; a software module configured to regulate an airflow; a software module configured to regulate an air pressure; a software module configured to regulate a flow of water and nutrients; a software module configured to regulate an aqueous nutrient concentration of an aqueous nutrient solution; a software module configured to regulate an aqueous pH; a software module configured to regulate a water oxidation reduction potential (ORP); a software module configured to regulate an aqueous electrical conductivity (EC); a software module configured to regulate a quality or a quantity of a light emission from a light source; or a software module configured to regulate a movement of the first crop growth modules around a growing circuit; in response to the instructions. In some embodiments, the sensor for placement in the sensor unit mounted in or on the second crop growth module further measures data corresponding to a second environmental growing condition inside the second crop growth module over time. In some embodiments, the second environmental growing condition comprises a characteristic of the aqueous crop nutrient solution. In some embodiments, the environmental growing condition comprises: an air temperature inside the crop growth module; a humidity inside the crop growth module; an airflow inside the crop growth module; a temperature of the aqueous nutrient solution; a pH of the aqueous nutrient solution; an electrical conductivity of the nutrient solution; a flow rate of the aqueous nutrient solution; an aqueous nutrient concentration of the aqueous nutrient solution; a pH of the aqueous nutrient solution; a dissolved $O_2$ concentration of the aqueous nutrient solution; a dissolved $CO_2$ concentration of the aqueous nutrient solution; a water oxidation reduction potential (ORP) of the aqueous nutrient solution; an electrical conductivity (EC) of the aqueous nutrient solution; or a nutrient composition of the aqueous nutrient solution. In some embodiments, the processing device further comprises a receiver for receiving transmitted data. In some embodiments, the processing device further comprises a transmitter for transmitting data. In some embodiments, the receiver and transmitter are configured for wired or wireless receipt or transmission of data. In some embodiments, the control system is further configured to automatically monitor and adjust one or more of the environmental growing conditions in the environmentally-controlled vertical farming growing chamber in response to the instructions.

In a second broad aspect, further provided herein is a sensor system 30 for use in measuring two or more crop growing conditions in an environmentally-controlled growth system, for example a greenhouse. FIGS. 1A and 1B depict external views of exemplary growing chambers for use with control systems of the present disclosure. The sensor system includes a sensor unit 110, which is configured to be mounted in, or on, a growth module in a vertical growth tower within the growth system. The growth module is configured to stackably support one or more other growth modules, above and/or below itself in the vertical growth tower. The growth module is also configured to permit vertical flow of an aqueous crop nutrient solution, for example a solution typically used in hydroponic agriculture, to another growth module below itself within the tower. For example, the growth module may have an aperture that allows for flow of the solution through the module, or it may permit the solution to flow around and/or over itself, down toward a module below. The module may itself be configured appropriately to contain a growing crop plant. The module may have a lateral growth opening allowing for a growing plant to grow laterally from the module, with roots housed in the module. Alternatively, the module may be a "dummy" module, which is representative of other growth modules in terms of stackability and permission of nutrient solution vertical flow, but is not itself configured to contain a growing plant.

The sensor unit 110 is configured to, when mounted in, to and/or on the growth module, measure and collect input data. The input data corresponds with a crop growing condition outside of the growth module at a plant canopy level. The plant canopy level corresponds with the area where either a) a growing plant canopy exists (the plant growing out of an opening 106 in the growth module 104), or b) the region in space corresponding with where a growing plant's canopy would be, if the growth module did contain a growing plant. An exemplary sensor is depicted at FIGS. 11A, 11B, 11C, 12A and 12B adapted for placement in the growth module 104 depicted in FIGS. 5A, 5B, 6A and 6B.

By way of non-limiting example, in cases where plant growth modules in the vertical growth tower are adapted to house a growing lettuce plant, an area adjacent to each growth module will correspond with an area of plant canopy for each growing lettuce plant. The area may be, for example, adjacent to a lateral growth opening 106 in the growth module 104. The area may occupy approximately the area of one growing lettuce (or other plant species, as appropriate) plant. The area may occupy a region in space comprising, for example, about a 3", 6", 9", 12", 15", 18", 21", or 24" layer adjacent to the growth module. In any case, the sensor unit 110 is configured to measure and collect input data corresponding with a first crop growing condition at the plant canopy level, outside of the growth module.

Figure 4:
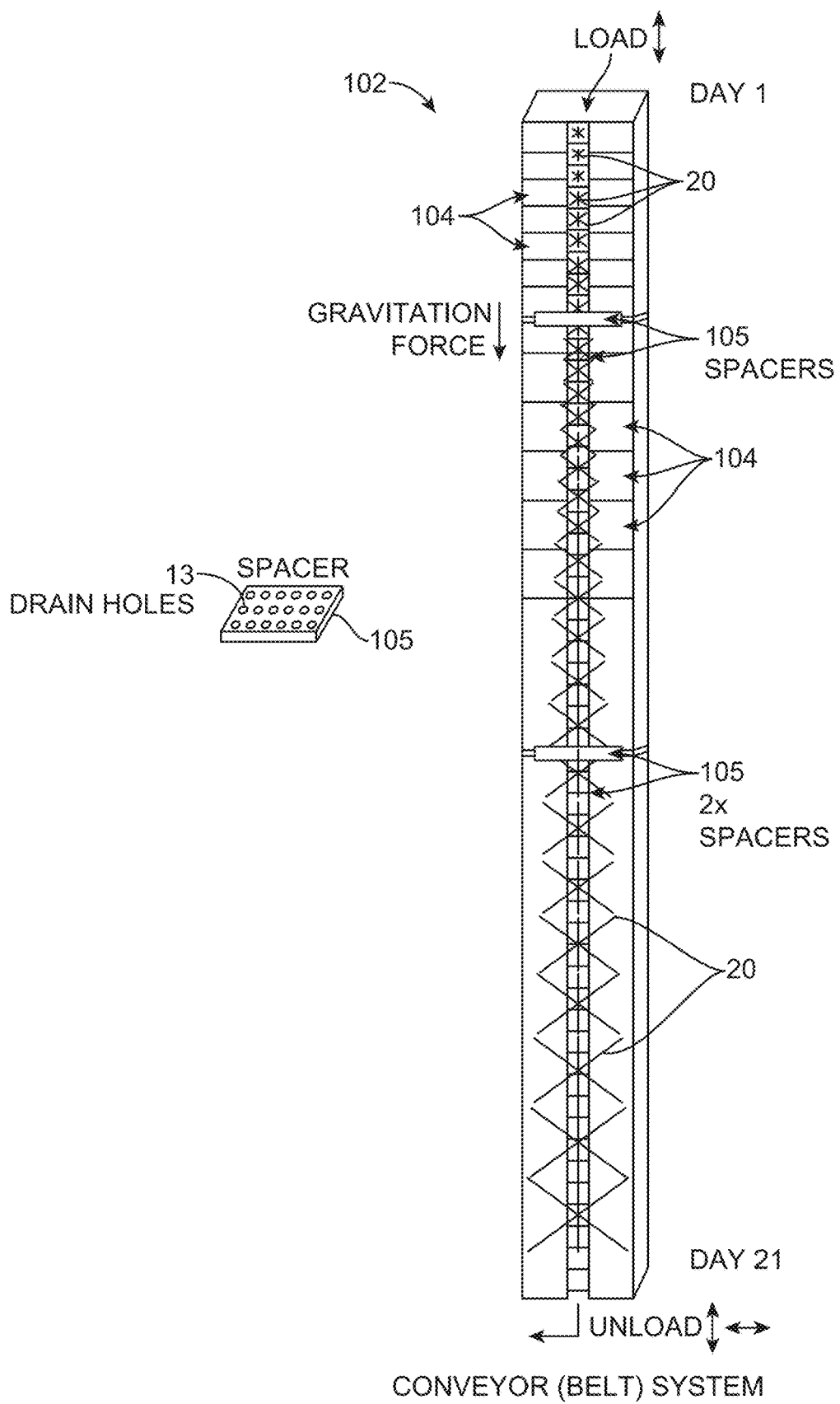
FIG. 4 is a schematic of a vertical column structure illustrating possible spacing configurations of hydroponic plant growth modules and spacers depending on loading and unloading schemes, the growth cycle of the crop as it could relate to a loading/unloading scheme, the size of the plant in each hydroponic plant growth module and the weight of the growth modules.

As would now be obvious to one skilled in the art, spacer modules 105 could be stacked above, below and between sensor modules 110, and hydroponic plant growth modules 104 to create adequate growth areas and under-canopy spacing between growing plants during the growth cycle. Additionally, the intra-growth module space could be increased during the growth cycle, as needed to accommodate extra growth and to optimize logistical spacing in the growth column during the growth cycle. By way of non-limiting example, in cases where hydroponic plant growth modules in the vertical growth tower are adapted to house a growing plant that ultimately requires additional spacing between hydroponic plant growth modules during the growth cycle, FIGS. 4 and 5B illustrate where spacer modules 105 (and/or sensor modules 110) are configured to be placed in single or multiple layers between hydroponic plant growth modules. The placement of these additional modules can occur at any time in the growth cycle, in the initial seeding stages, or during the middle or later growth stages, using either manual or automated loading and conveyor systems as will be described hereinafter.

Figure 6A:
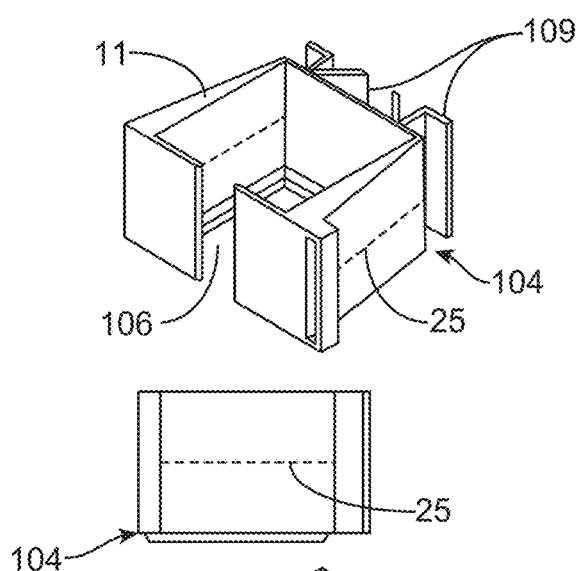
FIG. 6A is an illustrative top isometric, side and bottom isometric view of one of many possible configurations of a growth module, illustrating a V-baffle hinge connection, one of many possible hinge configurations.
Figure 6A:
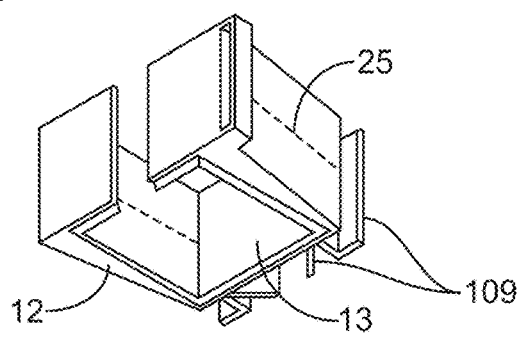
Figure 7A:
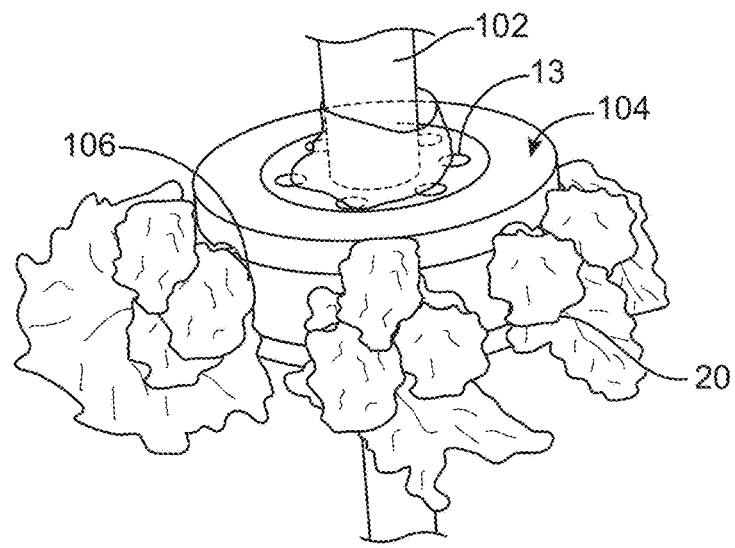
FIG. 7A is another illustrative isometric view of one of many possible configurations of a growth module, illustrating a circular design with a plurality of lateral growth openings.
Figure 7B:
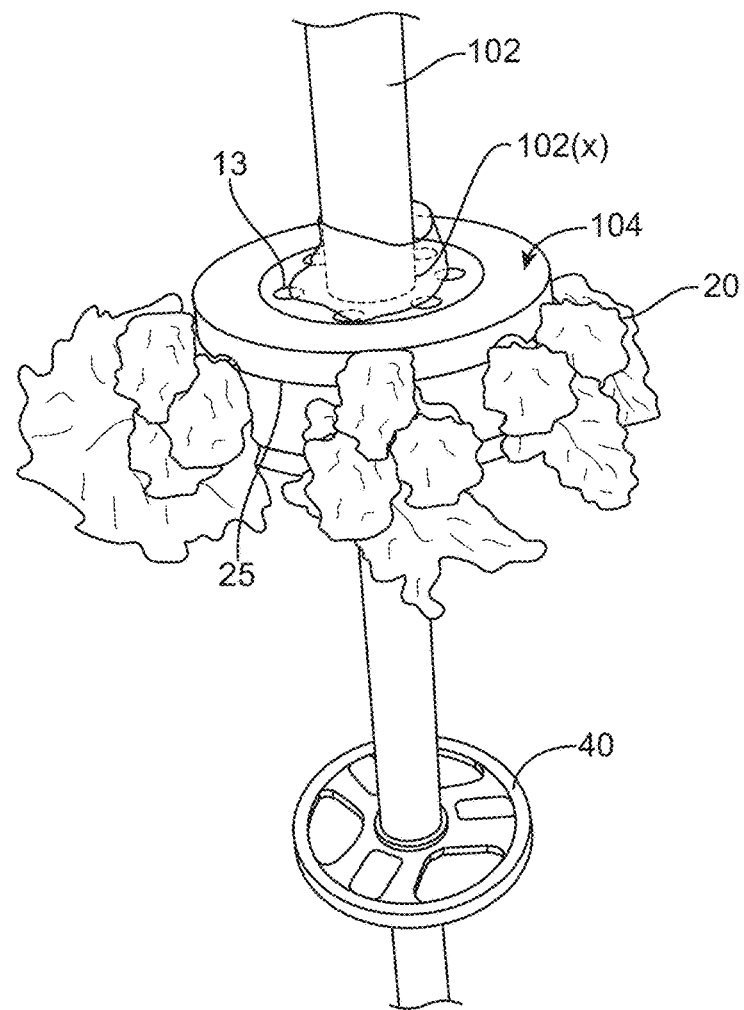
FIG. 7B is an illustrative example of a circular growth module configuration on a suspended circular vertical column with a counter-weight to provided added stability.

Still further, in some embodiments the hydroponic plant growth modules 104 and spacer modules 105 are configured with expandable wall height means 25, as illustrated in FIGS. 6A and 7B. The expandable hydroponic plant growth modules provide additional means to generate alternate, non-standard module heights to accommodate larger plant crops and achieve a logistically preferable spacing between hydroponic plant growth modules.

At least one growing condition 610 measured at the plant canopy level is temperature, humidity, and carbon dioxide, and the sensor unit may accordingly comprise a temperature sensor, a carbon dioxide sensor, and/or a humidity sensor or hygrometer. Monitoring each of these growing conditions at the plant canopy level is thought to be important for measuring the likely health of a growing crop plant. The sensor unit may also comprise one or more of an ambient air speed sensor, an air pressure sensor, or a sensor for measuring light quality or quantity, at the plant canopy level.

The sensor unit is also configured to measure and collect input data corresponding with at least one other, or "second" crop growing condition. The "second" crop growing condition is a measured characteristic of the aqueous crop nutrient solution provided by the nutrient supply system 300. In the vertical farming system, nutrients and water are supplied to the growing plants (housed within the growth modules, themselves stacked within the vertical growth towers) in an aqueous crop nutrient solution. Such crop nutrient solutions possess numerous measurable and quantifiable characteristics, one or more of which may be measured by the sensor. For example, the sensor unit may include one or more of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor. Such sensors may be configured for placement in or on the growth module and positioned to measure and collect input data corresponding to the measured characteristic of the aqueous crop nutrient solution. In examples where the sensor unit includes a nutrient concentration sensor, this sensor may be configured to sense concentration, in the nutrient solution, of one or more of zinc, molybdenum, manganese, iron, copper, chlorine, boron, sulfur, magnesium, calcium, potassium, phosphorus, and nitrogen.

In some examples, the sensor system also includes a transmitter (not shown), which is configured for transmitting (wirelessly and/or by wire) collected input data to a master box, which collects, organizes, and collates the received data. The master box may include a wireless receiver (not shown), for receiving the transmitted input data from the sensor units. It may also include a digital processing device 635, which includes an operating system configured to perform executable instructions and a memory. It may also include a computer program including instructions executable by the digital processing device configured to collect, organize and collate the input data, and to transmit the organized and collated input data to a computer-implemented automated control system. The control system 600 may be configured to monitor, analyze and adjust one or more crop growing conditions 610 in the environmentally controlled growth environment 100 in response to the input data. The master box may itself also include a transmitter, for transmission of the organized and collated input data to the automated control system.

Figure 12A:
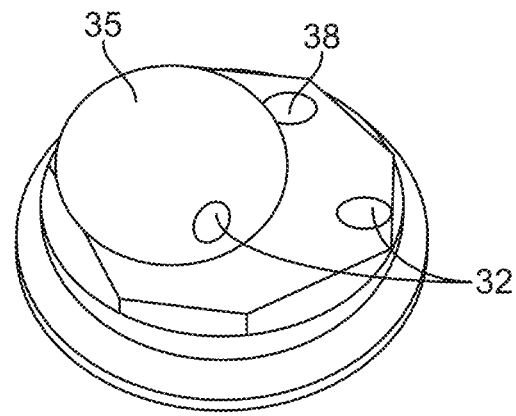
FIG. 12A is an illustrative view of a device for placement over an opening of a growth module and having apertures therethrough allowing for one or more sensors to protrude therefrom.
Figure 12B:
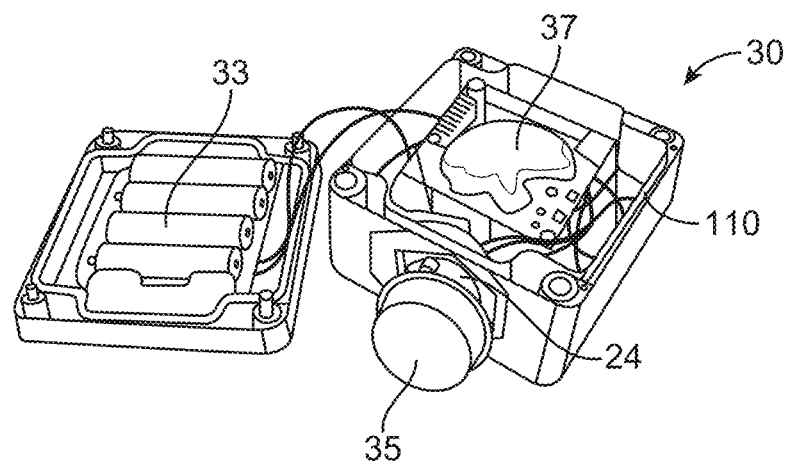
FIG. 12B is an illustrative view of a growth module containing a sensor unit including sensors for sensing one or more environmental growing conditions, with a device for placement over an opening of the growth module and having apertures therethrough allowing for one or more sensors to protrude therefrom.

In some examples, the sensor unit is waterproof or water resistant. The sensor system comprises a sensor module 110, a sensor circuit board 31, a sensor mounting port 32, a sensor battery pack 33, a sensor nose mount 34, a sensor nose 35, a sensor circuit mounting board 37, configurable for mounting a sensor 615 (not shown) or a crop characteristic measuring device 625 (not shown) and a digital imaging device/crop characteristic device mounting port 38. With reference to FIGS. 12A and 12B, the sensor unit includes a waterproof "nose" 35 configured for placement over an opening of a growth module 24, which may be made of plastic or some other suitable material, the nose including one, two, three or more apertures 32, 38. In some embodiments, the "nose" is not permeable to water, but is permeable to gases, thus permitting for passage of gases therethrough and not liquids, further permitting insulation of carbon dioxide or other gas sensors for use in an environment frequently exposed to wet conditions. Protruding from the apertures in the "nose" may be one or more sensors 615, for sensing one or more environmental conditions at a plant canopy level, for example, temperature, humidity, or carbon dioxide content. In some examples, the sensor(s) for sensing the "first" crop growing condition at a plant canopy level are in functional communication, either wirelessly or by wire, with the sensor(s) for sensing the "second" crop growing condition of the nutrient solution. The sensor unit may be adapted to fit within a plant growth unit 104, through or around which nutrient solution flows during plant growth. In such examples, the sensor unit may include one or more sensors for sensing the "second" crop growth condition (of the nutrient solution) inside the growth unit, while also including one or more sensors protruding from a growth opening in the growth unit, positioned in space corresponding with where a growing plant canopy would be, and sensing the "first" growth condition at the plant canopy level.

It should be appreciated that the sensor nose mount 34 and the sensor nose 35 provide a water-tight seal to the sensor module 110, wherein the (at least) moisture resistant sensors 615 (not shown) inserted in the sensor mounting port 32 and/or the (at least) moisture resistant crop characteristic measuring device 625 (not shown) inserted in the digital imaging device/crop characteristic device mounting port 38 are capable of obtaining environmental and crop characteristic data while keeping moisture and other environmental factors out of the sensor module which could potentially affect longevity of the module, the sensors, the crop characteristic measuring device, the sensor circuit board 31, and the sensor circuit mounting board 37 or the integrity of the data measured. It should also be appreciated that a transmitter (not shown) embedded within the sensor module is capable of transmitting the measured data to a master control system 600 associated with the computer-implemented control system for the vertical farm system.

In a third broad aspect, provided herein is a computer-implemented control system for a vertical farm system. The control system includes at least two (a "first" and a "second") stacked crop growth modules, the system for operation in an environmentally-controlled growing chamber, for example a greenhouse. FIGS. 1A and 1B depict external views of exemplary growing chambers for use with control systems of the present disclosure.

The control system includes at least one sensor unit. An exemplary sensor is depicted in FIGS. 11A, 11B, 11C, 12A and 12B, adapted for placement in the plant growth module, spacer module or sensor module 104/105/110 depicted in FIGS. 5A, 5B, 6A and 6B. The sensor unit is configured to be mounted in, or on, the "first" growth module, which itself is configured to stack with the "second" growth module in a vertical growth tower within the growth system. The "first" growth module is also configured to permit vertical flow of an aqueous crop nutrient solution, for example a solution typically used in hydroponic agriculture, to another growth module below itself within the tower. For example, the growth module may have an aperture that allows for flow of the solution through the module, or it may permit the solution to flow around and/or over itself, down toward a module below. The module may itself be configured appropriately to contain a growing crop plant. The module may have a lateral growth opening allowing for a growing plant to grow laterally from the module, with roots housed in the module. Alternatively, the module may be a "dummy" module, which is representative of other growth modules in terms of stackability and permission of nutrient solution vertical flow, but is not itself configured to contain a growing plant.

The sensor unit is configured to, when mounted in, to and/or on the "first" growth module, measure and collect input data. The input data corresponds with a crop growing condition outside of the growth module at a plant canopy level. The plant canopy level corresponds with the area where either a) a growing plant canopy exists (the plant growing out of an opening in the growth module), or b) the region in space corresponding with where a growing plant's canopy would be, if the growth module did contain a growing plant.

By way of non-limiting example, in cases where plant growth modules in the vertical growth tower are adapted to house a growing lettuce plant, an area adjacent to each growth module will correspond with an area of plant canopy for each growing lettuce plant. The area may be, for example, adjacent to a lateral growth opening in the growth module. The area may occupy approximately the area of one growing lettuce (or other plant species, as appropriate) plant. The area may occupy a region in space comprising, for example, about a 3", 6", 9", 12", 15", 18", 21", or 24" layer adjacent to the growth module. In any case, the sensor unit is configured to measure and collect input data corresponding with a first crop growing condition at the plant canopy level, outside of the "first" growth module.

At least one growing condition measured at the plant canopy level is temperature, humidity, and carbon dioxide, and the sensor unit may accordingly comprise a temperature sensor, a carbon dioxide sensor, and/or a humidity sensor or hygrometer. Monitoring each of these growing conditions at the plant canopy level is thought to be important for measuring the likely health of a growing crop plant. The sensor unit may also comprise one or more of an ambient air speed sensor, an air pressure sensor, or a sensor for measuring light quality or quantity, at the plant canopy level.

The sensor unit is also configured to measure and collect input data corresponding with at least one other, or "second" crop growing condition. The "second" crop growing condition is a measured characteristic of the aqueous crop nutrient solution. In the vertical farming system, nutrients and water are supplied to the growing plants (housed within the growth modules, themselves stacked within the vertical growth towers) in an aqueous crop nutrient solution. Such crop nutrient solutions possess numerous measurable and quantifiable characteristics, one or more of which may be measured by the sensor. For example, the sensor unit may include one or more of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor. Such sensors may be configured for placement in or on the growth module and positioned to measure and collect input data corresponding to the measured characteristic of the aqueous crop nutrient solution. In examples where the sensor unit includes a nutrient concentration sensor, this sensor may be configured to sense concentration, in the nutrient solution, of one or more of zinc, molybdenum, manganese, iron, copper, chlorine, boron, sulfur, magnesium, calcium, potassium, phosphorus, and nitrogen.

In some examples, the sensor system also includes a transmitter, which is configured for transmitting (wirelessly and/or by wire) collected input data to a master box, which collects, organizes, and collates the received data. The master box may include a wireless receiver, for receiving the transmitted input data from the sensor units. It may also include a digital processing device, which includes an operating system configured to perform executable instructions and a memory. It may also include a computer program including instructions executable by the digital processing device configured to collect, organize and collate the input data, and to transmit the organized and collated input data to a computer-implemented automated control system. The control system may be configured to monitor, analyze and adjust one or more crop growing conditions in the environmentally controlled growth environment in response to the input data. The master box may itself also include a transmitter, for transmission of the organized and collated input data to the automated control system.

In some examples, the sensor unit is waterproof or water resistant. With reference to FIGS. 12A and 12B, the sensor unit includes a waterproof "nose", which may be made of plastic or some other suitable material, the nose including one, two, three or more apertures. Protruding from the apertures in the "nose" are one or more sensors, for sensing one or more environmental conditions at a plant canopy level, for example, temperature, humidity, or carbon dioxide content. In some examples, the sensor(s) for sensing the "first" crop growing condition at a plant canopy level are in functional communication, either wirelessly or by wire, with the sensor(s) for sensing the "second" crop growing condition of the nutrient solution. The sensor unit may be adapted to fit within a plant growth unit, through which nutrient solution flows during plant growth. In such examples, the sensor unit may include one or more sensors for sensing the "second" crop growth condition (of the nutrient solution) inside the growth unit, while also including one or more sensors protruding from a growth opening in the growth unit, positioned in space corresponding with where a growing plant canopy would be, and sensing the "first" growth condition at the plant canopy level.

The sensor may measure the environmental growing condition(s) continually, or at intervals during the growing cycle of the crop plant grown in the vertical farming system. The environmental growing condition data generated by the sensor may, for example, provide a "fingerprint" corresponding to one or more environmental conditions experienced by a growing crop plant over time over the course of its growth, for example up until the time of harvest. Alternatively, the data may correspond with only two or more time points during the course of the plant's growth cycle.

The vertical farming system also includes a device for measuring a quantifiable crop characteristic of a crop grown in the growth module, to generate corresponding crop growth data. The device may be a digital imaging device, such as a digital camera, suitable for capturing images of growing crop plants which may be used for generating measurements of leaf area index (LAI). The device may also be for measuring the weight, sugar content, water content, acidity, or other properties of the crop plant. It may generate crop characteristic data corresponding with any one or more of the measured quantifiable crop characteristic(s). The device may be positionable within the vertical farming system such that it may measure the quantifiable characteristic during plant growth, and/or after harvest. For example, a digital imaging apparatus may be stationary, and positioned such that it captures digital images of crop plants as they pass by while travelling around a growth circuit. Alternatively, the apparatus may be mounted to a drone which flies about the vertical farming system capturing images of growing plants.

The vertical farming system also includes a processing device, which includes a processor, a memory, an operating system configured to perform executable instructions, and a computer program. The processing device may also include a receiver, for receiving transmitted data, and/or a transmitter, for transmitting data. The receiver and transmitter may be configured for wired, and/or wireless receipt or transmission of data. The computer program includes instructions which may be executed by the processing device to create an application. The application includes a software module, which is configured to receive environmental condition data generated by the sensor(s), and crop characteristic data generated by the device(s). It also includes a software module that applies an algorithm to the environmental condition data generated by the sensor(s), and to the crop characteristic data generated by the device(s). By application of the algorithm, one or more improved environmental growing condition(s) are generated. The processing device also includes a software module that generates instructions for adjustment of the environmental growing condition(s) in or around the crop growth module to the improved environmental growing condition.

In a simple and non-limiting example, the algorithm may be applied to data corresponding with a particular air temperature over the course of a crop's growing cycle, which represents an increase over a previous measured air temperature, and data corresponding to the crop's leaf area index, which represents an increase over the leaf area index of a crop grown under the previously measured air temperature conditions. In such a case, the newly measured temperature would represent an improved environmental growing condition. The software module would then generate instructions for adjusting the temperature in or around the crop growing module. The temperature could then be adjusted, either automatically, or with human intervention. Some control systems may be configured to automatically monitor and adjust the growing condition(s) in response to the instructions.

In other examples, the measured crop characteristic may represent a decrease in leaf area index, and instructions would be generated for adjusting the temperature back to the previously measured temperature, corresponding with a larger leaf area index. In some examples, a plurality of two, three, or four or more environmental conditions would be measured over time during the crop cycle, and application of the algorithm to data corresponding with this combination of measured environmental conditions would generate improved growing conditions for each of the measured conditions. For example, instructions for adjustment to improved levels of any combination of air temperature, humidity, gaseous carbon dioxide, and/or any combination of characteristics of an aqueous nutrient solution may be generated.

The control system may include one or more software modules configured for regulating one or more of temperature, humidity, gaseous or aqueous $CO_2$ or $O_2$ content, airflow, air pressure, flow of water and nutrients, aqueous nutrient concentration of an aqueous nutrient solution, aqueous pH, water or aqueous oxidation reduction potential (ORP), aqueous electrical conductivity (EC), a quality or a quantity of light emission from a light source, and movement of plant growth modules around a growing circuit.

In some examples, numerous sensors are distributed about the environmentally-controlled growing chamber to provide environmental data corresponding with their individual positions. In some examples, sensors are distributed about one or more vertical growth tower, each corresponding with a position of a growth module within the growth tower. In preferred examples, a sufficient number of sensors is used such that environmental data (corresponding with one or more environmental condition(s) generated by this plurality of sensors such that the environmental condition(s) at any position within the tower (or within the system) may be predicted with 95% statistical confidence.

In a fourth broad aspect, provided herein is a computer-implemented method for operating a control system for a vertical farming system comprising at least a first crop growth module and operating in an environmentally-controlled growing chamber. The method includes training a machine learning algorithm to identify a plurality of recommended environmental growing conditions for a crop growing in the crop growth module of the vertical farming system by providing historic environmental growing condition data and crop growth data. The method includes the following steps:
  receiving real-time data from a plurality of sensors, each sensor measuring an environmental growing condition in the environmentally-controlled growing chamber;
  receiving real-time data from a device, the device measuring a crop characteristic of the crop growing in the crop growth module of the vertical farming system; and
  applying the trained machine learning algorithm to the real-time data from the plurality of sensors and the real-time data from the device to generate instructions for adjustment of each of the environmental growing conditions in the environmentally-controlled growing chamber to the recommended environmental growing conditions.

The sensors may be configured to be mounted in, or on, a "first" growth module, which itself is configured to stack with a "second" growth module in a vertical growth tower within the growth system. An exemplary sensor is depicted in FIGS. 11A, 11B, 11C, 12A and 12B, adapted for placement in the plant growth module, spacer module or sensor module 104/105/110 depicted in FIGS. 5A, 5B, 6A and 6B. The "first" growth module is configured to permit vertical flow of an aqueous crop nutrient solution, for example a solution typically used in hydroponic agriculture, to another growth module below itself within the tower. For example, the growth module may have an aperture that allows for flow of the solution through the module, or it may permit the solution to flow around and/or over itself, down toward a module below. The module may itself be configured appropriately to contain a growing crop plant. The module may have a lateral growth opening allowing for a growing plant to grow laterally from the module, with roots housed in the module. Alternatively, the module may be a "dummy" module, which is representative of other growth modules in terms of stackability and permission of nutrient solution vertical flow, but is not itself configured to contain a growing plant.

The sensor may be configured to, when mounted in, to and/or on the "first" growth module, measure and collect input data. The input data corresponds with a crop growing condition outside of the growth module at a plant canopy level. The plant canopy level corresponds with the area where either a) a growing plant canopy exists (the plant growing out of an opening in the growth module), or b) the region in space corresponding with where a growing plant's canopy would be, if the growth module did contain a growing plant.

By way of non-limiting example, in cases where plant growth modules in the vertical growth tower are adapted to house a growing lettuce plant, an area adjacent to each growth module will correspond with an area of plant canopy for each growing lettuce plant. The area may be, for example, adjacent to a lateral growth opening in the growth module. The area may occupy approximately the area of one growing lettuce (or other plant species, as appropriate) plant. The area may occupy a region in space comprising, for example, about a 3" 6", 9", 12", 15", 18", 21", or 24" layer adjacent to the growth module. In any case, the sensor unit is configured to measure and collect input data corresponding with a first crop growing condition at the plant canopy level, outside of the "first" growth module.

At least one growing condition measured at the plant canopy level may be temperature, humidity, and carbon dioxide, and the sensor unit may accordingly comprise a temperature sensor, a carbon dioxide sensor, and/or a humidity sensor or hygrometer. Monitoring each of these growing conditions at the plant canopy level is thought to be important for measuring the likely health of a growing crop plant. The sensor unit may also comprise one or more of an ambient air speed sensor, an air pressure sensor, or a sensor for measuring light quality or quantity, at the plant canopy level.

The sensor may also configured to measure and collect input data corresponding with at least one other, or "second" crop growing condition. The "second" crop growing condition is a measured characteristic of the aqueous crop nutrient solution. In the vertical farming system, nutrients and water are supplied to the growing plants (housed within the growth modules, themselves stacked within the vertical growth towers) in an aqueous crop nutrient solution. Such crop nutrient solutions possess numerous measurable and quantifiable characteristics, one or more of which may be measured by the sensor. For example, the sensor unit may include one or more of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor. Such sensors may be configured for placement in or on the growth module and positioned to measure and collect input data corresponding to the measured characteristic of the aqueous crop nutrient solution. In examples where the sensor unit includes a nutrient concentration sensor, this sensor may be configured to sense concentration, in the nutrient solution, of one or more of zinc, molybdenum, manganese, iron, copper, chlorine, boron, sulfur, magnesium, calcium, potassium, phosphorus, and nitrogen.

In some examples, the sensor may be incorporated within a system which also includes a transmitter, which is configured for transmitting (wirelessly and/or by wire) collected input data to a master box, which collects, organizes, and collates the received data. The master box may include a wireless receiver, for receiving the transmitted input data from the sensor units. It may also include a digital processing device, which includes an operating system configured to perform executable instructions and a memory. It may also include a computer program including instructions executable by the digital processing device configured to collect, organize and collate the input data, and to transmit the organized and collated input data to a computer-implemented automated control system. The control system may be configured to monitor, analyze and adjust one or more crop growing conditions in the environmentally controlled growth environment in response to the input data. The master box may itself also include a transmitter, for transmission of the organized and collated input data to the automated control system.

In some examples, the sensor unit is waterproof or water resistant. With reference to FIG. 12A and FIG. 12B, the sensor unit includes a waterproof "nose", which may be made of plastic or some other suitable material, the nose including one, two, three or more apertures. Protruding from the apertures in the "nose" are one or more sensors, for sensing one or more environmental conditions at a plant canopy level, for example, temperature, humidity, or carbon dioxide content. In some examples, the sensor(s) for sensing the "first" crop growing condition at a plant canopy level are in functional communication, either wirelessly or by wire, with the sensor(s) for sensing the "second" crop growing condition of the nutrient solution. The sensor unit may be adapted to fit within a plant growth unit, through which nutrient solution flows during plant growth. In such examples, the sensor unit may include one or more sensors for sensing the "second" crop growth condition (of the nutrient solution) inside the growth unit, while also including one or more sensors protruding from a growth opening in the growth unit, positioned in space corresponding with where a growing plant canopy would be, and sensing the "first" growth condition at the plant canopy level.

The sensor may measure the environmental growing condition(s) continually, or at intervals during the growing cycle of the crop plant grown in the vertical farming system. The environmental growing condition data generated by the sensor may, for example, provide a "fingerprint" corresponding to one or more environmental conditions experienced by a growing crop plant over time over the course of its growth, for example up until the time of harvest. Alternatively, the data may correspond with only two or more time points during the course of the plant's growth cycle.

Devices for use with methods of the present disclosure may be configured for measuring a quantifiable crop characteristic of a crop grown in the growth module, to generate corresponding crop growth data. The device may be a digital imaging device, such as a digital camera, suitable for capturing images of growing crop plants which may be used for generating measurements of leaf area index (LAI). The device may also be for measuring the weight, sugar content, water content, acidity, or other properties of the crop plant. It may generate crop characteristic data corresponding with any one or more of the measured quantifiable crop characteristic(s). The device may be positionable within the vertical farming system such that it may measure the quantifiable characteristic during plant growth, and/or after harvest. For example, a digital imaging apparatus may be stationary, and positioned such that it captures digital images of crop plants as they pass by while travelling around a growth circuit. Alternatively, the apparatus may be mounted to a drone which flies about the vertical farming system capturing images of growing plants.

In a simple and non-limiting example, the algorithm may be applied to data corresponding with a particular air temperature over the course of a crop's growing cycle, which represents an increase over a previous measured air temperature, and data corresponding to the crop's leaf area index, which represents an increase over the leaf area index of a crop grown under the previously measured air temperature conditions. In such a case, the newly measured temperature would represent an improved environmental growing condition. The software module would then generate instructions for adjusting the temperature in or around the crop growing module. The temperature could then be adjusted, either automatically, or with human intervention. Some control systems may be configured to automatically monitor and adjust the growing condition(s) in response to the instructions.

In other examples, the measured crop characteristic may represent a decrease in leaf area index, and instructions would be generated for adjusting the temperature back to the previously measured temperature, corresponding with a larger leaf area index. In some examples, a plurality of two, three, or four or more environmental conditions would be measured over time during the crop cycle, and application of the algorithm to data corresponding with this combination of measured environmental conditions would generate improved growing conditions for each of the measured conditions. For example, instructions for adjustment to improved levels of any combination of air temperature, humidity, gaseous carbon dioxide, and/or any combination of characteristics of an aqueous nutrient solution may be generated.

In some examples of the provided methods, numerous sensors are distributed about the environmentally-controlled growing chamber to provide environmental data corresponding with their individual positions. In some examples, sensors are distributed about one or more vertical growth tower, each corresponding with a position of a growth module within the growth tower. In preferred examples, a sufficient number of sensors is used such that environmental data (corresponding with one or more environmental condition(s) generated by this plurality of sensors such that the environmental condition(s) at any position within the tower (or within the system) may be predicted with 95% statistical confidence.

Exemplary Vertical Growth Towers and Growth Modules Suitable for Use In or With the Control and Sensor Systems of the Present Disclosure As detailed above, control systems of the present disclosure may comprise growth modules stackable in vertical growth towers. Further, sensor systems of the present disclosure may be include sensors suitable for mounting in, or, or to such stackable growth modules. Vertical growth towers of the present disclosure may include: a plurality of growth modules, each growth module comprising: an enclosure configured to securely hold at least one plant; a drain aperture in the enclosure; and at least one lateral growth opening in the enclosure configured to permit growth of the at least one plant therethrough, and to encourage lateral growth of the at least one plant away from the enclosure; wherein one or more of the growth modules is configured to stackably support one or more of the other growth modules above and/or below itself within the tower, wherein the drain aperture is configured to facilitate vertical flow of fluids between growth modules within the tower, and wherein said lateral growth opening is configured to allow for an airflow to disrupt a boundary layer of an under-canopy of the at least one plant growing away from the growth module.

As shown in FIG. 4, a vertical growth tower 102, or simply a "tower", is illustrated with a plurality of growth modules 104 stacked vertically, one on top of another. Each growth module 104 may be placed directly on top of the prior growth module, or spaced apart, with or without a "spacer" 105 between each growth module, depending on the stage of the growth cycle. Spacers, when used, are optionally configured with holes 13 to allow for passage of airflow and moisture between vertically-spaced growth modules. Each module is configured as an enclosure with at least one lateral growth opening 106, configured to permit and encourage growth of a plant laterally, away from the growth module. The plant growth module 104 is configured for: containing and supporting hydroponic plant growth media, for containing and supporting a root structure of at least one crop plant 20 growing therein; the at least one crop plant being of a gravitropic plant species, wherein the plants roots grow generally in the direction of gravitational pull (i.e., downward) and stems grow generally in the opposite direction (i.e., upwards). Additionally, the utilization of the lateral growth opening and resulting lateral growth of a plant provides an opportunity for better circulation of airflow from a variety of directions, to better disrupt a boundary layer of an under-canopy of a plant, thus minimizing stagnant moisture accumulation and the potential for undesired biologic growth (i.e.: fungus, etc.).

An enclosure stack utilized in a particular tower or columnar growth structure is configured from a plethora of potential shapes, but generally speaking, all growth modules within a particular tower or columnar growth structure would ideally be the same shape. Alternatively, it is also conceived that the enclosures could have different shapes for the containment component of the growth module, but be configured with identical mounting components on the top and/or bottom that would allow for stacking of different shaped growth modules.

In some embodiments, the plurality of growth modules is an unsupported, self-standing tower.

As further illustrated in FIG. 4, a vertical growth tower is configured to stand as an unsupported, self-standing tower. This is possible due to the construction of the containment shape of the growth module. The containment shape is configurable to allow for the growth modules to potentially snap, press-fit, or otherwise snugly adhere to one another in a vertical fashion, providing stability to the structure In some embodiments of the tower, a growth module is configured to provide a containment shape comprising: a completely circular shape; a partially circular shape; an elliptical shape; an irregular geometric shape; a non-symmetric, irregular geometric shape; a symmetric, multi-sided geometric shape; a triangular shape; a rectangular shape; a square shape; a trapezoidal shape; a pentagonal shape; a hexagonal shape; a heptagonal shape; an octagonal shape; a geometric shape comprising non-flat sides; or any combination thereof.

As noted above, there are a variety of potential shapes that the enclosures could have, resulting in towers or vertical growth structures of similar vertical shape. There are a virtually limitless number of potential containment shapes that can be utilized.

Figure 6B:
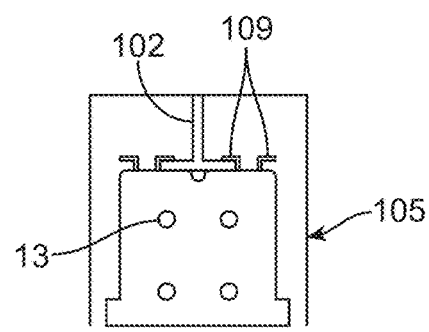
FIG. 6B is an illustrative top view of a spacer/sensor module illustrating a T-baffle hinge connection on a vertical column, one of many possible hinge configurations.
Figure 7C:
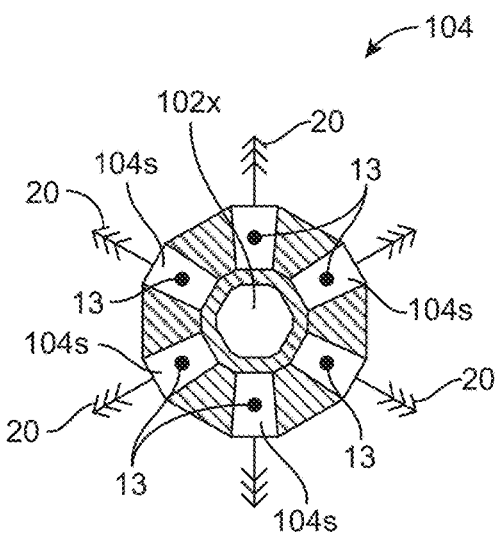
FIG. 7C is another illustrative top view of an alternative FIG. 12A configuration hydroponic plant growth module, illustrating a circular design comprising a plurality of hydroponic plant sub-module growth modules encased in a larger growth module housing.

Referring to FIGS. 6A through 6C, 7A through 7C, three such configurations are illustrated. FIGS. 6A and 6B illustrate a growth module having a containment shape that is representative of a rectangular shape or a square shape; whereas FIG. 7A illustrates a growth module having a containment shape that is representative of a completely circular shape; and FIG. 7C illustrates a composite growth module assembly having an assembly and containment shape that is representative of any number of shapes, depending on how they are described, including a completely circular shape; a partially circular shape; an elliptical shape; an irregular geometric shape; a non-symmetric, irregular geometric shape; a symmetric, multi-sided geometric shape; a triangular shape; a rectangular shape; a trapezoidal shape; a pentagonal shape; a hexagonal shape; a heptagonal shape; an octagonal shape; a geometric shape comprising non-flat sides; or any combination thereof.

In some embodiments of the tower, at least one of the growth modules has an adjustable height to accommodate growth of the at least one plant. Still further, in some embodiments the hydroponic plant growth modules 104 and spacer modules 105 are configured with expandable wall height means 25, as illustrated in FIGS. 6A and 7B.

Referring back to FIG. 4, it can now be appreciated that the growth modules are alternately configured to have adjustable sizing. This is desirable for a number of reasons and possible in a number of ways. At any given time during a plant growth cycle, it is desirable to provide more space between plants as they mature. By providing expandable growth modules, the space between stacked modules is easily accomplished without the need to transplant the plant to a new, larger/taller module.

When addressing the expandable nature of a growth module, the inventors have conceived a growth module with telescoping side walls that provide added space between stacked growth modules. The telescoping walls can come in at least two configurations; wherein a number of sliding, telescoping panels affixed to the outside of the containment shape, are movably and lockably adjusted to telescope up or down on the outside of the containment shape, providing additional air gap space between adjacent modules without changing the internal containment shape holding the growth medium and the plant. Alternatively, the telescoping walls can be integral to the containment shape, so that when the top and bottom of the containment walls of the growth module are pulled in opposite directions, the internal volume and external height of height of the growth module increases, providing a larger gap between the lateral openings of adjacent growth modules.

In some embodiments, the tower further comprises at least a partial lower surface connected to the containment shape. In some embodiments, the drain aperture is positioned in or near the at least partial lower surface. In some embodiments, the at least partial lower surface optionally comprises a non-perpendicular surface relative to the containment shape, configured to facilitate the movement of fluids toward the drain aperture.

As further illustrated in FIG. 6A, 7A or 7-C, the growth module containment shape is variable and allows for many scenarios for the optimization of plant growth and size. FIG. 6A illustrates a growth module with 3 complete sides and an incomplete, but connected fourth side with a lateral growth opening, a partially open upper surface and a partially open lower surface. The lateral growth opening may alternately be a hole of any shape in any complete and/or connected side of the containment shape. The partial lower surface provides for a drain aperture to facilitate vertical movement of fluids and nutrients from an upper growth module to a lower growth module. In the event of a solid or complete lower surface in the growth module, at least one drain hole would be provided. Additionally, the lower surface is optionally configured to have a slope that would encourage gravitational flow of the fluids and nutrients towards the drain aperture.

In some embodiments, the tower further comprises at least a partial upper surface connected to the containment shape. In some embodiments of the unsupported, self-standing tower, each growth module is orientable in a different direction from at least one other growth module within the tower.

Referring back to FIGS. 5C and 6A, it is apparent that some embodiments of the growth modules comprising the tower are alternately configured to have either open upper surfaces or partially open upper surfaces to, either of which are configurable to support stacking. As noted previously, the growth modules are configured to promote stacking, such that the at least one lateral growth opening in the enclosure of each module can be oriented in the same direction or an alternate direction to the growth module above or below it, simply be rotating the enclosure and securing the symmetric attachment features of the growth modules to the one above or below it.

Alternatively, FIG. 7A illustrates a circular growth module with multiple lateral growth openings in the containment shape. As with any of the other containment shapes, the illustrated growth module is stackable. The stackable assembly is possible with or without a central or support column. In the absence of a central column, a central hole would/could provide a conduit for airflow, additional fluid flow or nutrient supply conduits, for example. The illustrated module comprises both an upper and lower surface, and further comprises multiple apertures in both the top and bottom (not shown) surfaces to facilitate gravitational flow of the fluids and nutrients and vertical drainage to another growth module below.

Still further, FIG. 7C illustrates a top view of another circular growth module configuration on an optional circular vertical column, comprising a stackable sleeve configured to hold multiple growth modules. As with FIG. 7A, this module illustrates just one possible arrangement of multiple lateral growth openings in the containment shape. As described previously, the stackable sleeve assembly is possible with or without a central support column. In the absence of a central column, a central hole would/could provide a conduit for airflow, additional fluid flow or nutrient supply conduits, for example. As shown, a sleeve is configured with multiple slots or cut away sections configured to hold internally-captured growth modules, or alternately, sub-modules. Such a configuration makes it possible to optimize space on the column during the early growth cycle following germination, where a plant requires less space. At a later time, the internally-captured growth modules, or alternately, sub-modules, would be removed and either the plants therein would be transplanted to larger modules, or the modules themselves would simply be moved to a straight vertically-stacked column.

Alternatively, the inventors have also conceived of similar sleeved or compartmented module designs, mimicking the variety of containment shapes described previously for growth modules. In any one of these sleeved or compartmented growth module designs, the growth module is configured to hold a plurality of internally-captured growth modules or alternately, sub-modules. The internally-captured modules can be a standard or alternate shape, larger, the same or smaller in size than a regular production version of a growth module configured to accommodate a plant size at maturity.

It would be obvious to one skilled in the art that the size of any growth module is not limited. Growth modules can all be of a common size or be scaled larger or smaller as needed to accommodate the need. For example, newly germinated plants could be placed in a small, starter modules (of any shape), and placed in a sleeved containment module. Or newly germinated plants could be placed in a standard module (of any shape), and placed in a much larger sleeved containment module. Further still, newly germinated plants could be placed in small, starter modules (of any shape), and placed directly into a tower or vertical growth assembly, then later, transplanted into larger growth modules, if needed and replaced in the vertical growth assembly. Or alternately, the newly germinated plants could be placed in a standard module (of any shape), and placed directly into a tower or vertical growth assembly where it will remain for the entire growth cycle In some embodiments, a top end of the unsupported, self-standing tower 102 is configured for attachment to a conveyance system for conveying growth modules toward or away from the tower. In some embodiments of the unsupported, self-standing tower, a bottom end of the unsupported, self-standing tower is configured for attachment to a conveyance system for conveying growth modules toward or away from the tower.

In some embodiments, a top end of the unsupported, self-standing tower is configured for attachment to a support structure 103 capable of supporting a plurality other unsupported, self-standing towers 102. In some embodiments, the unsupported, self-standing tower is configured to rotate about its vertical axis when attached to the support structure for similarly exposing the attached enclosures to a light source and/or an airflow.

Figure 2:
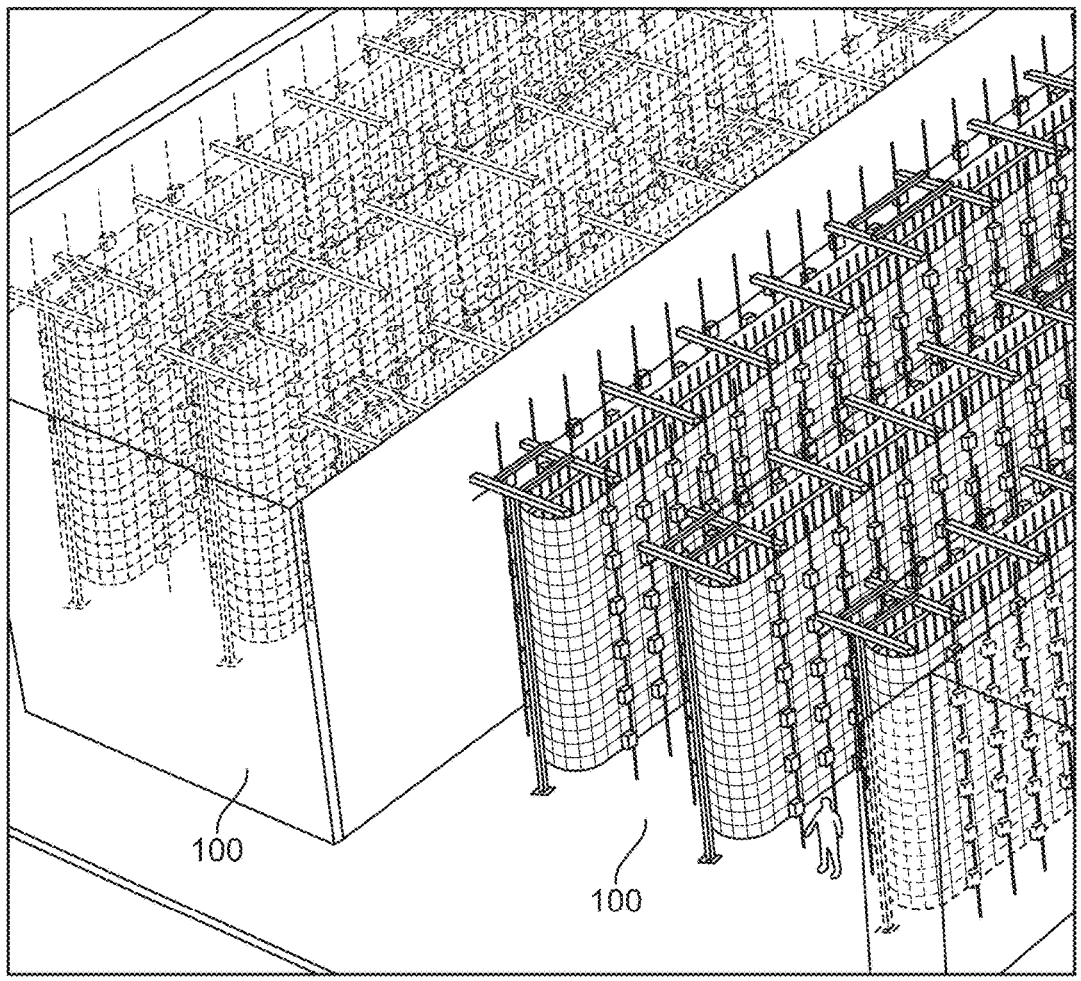
FIG. 2 is an illustrative isometric view of several multi-stage vertical growth systems within one of the environmentally controlled growing chambers.
Figure 3:
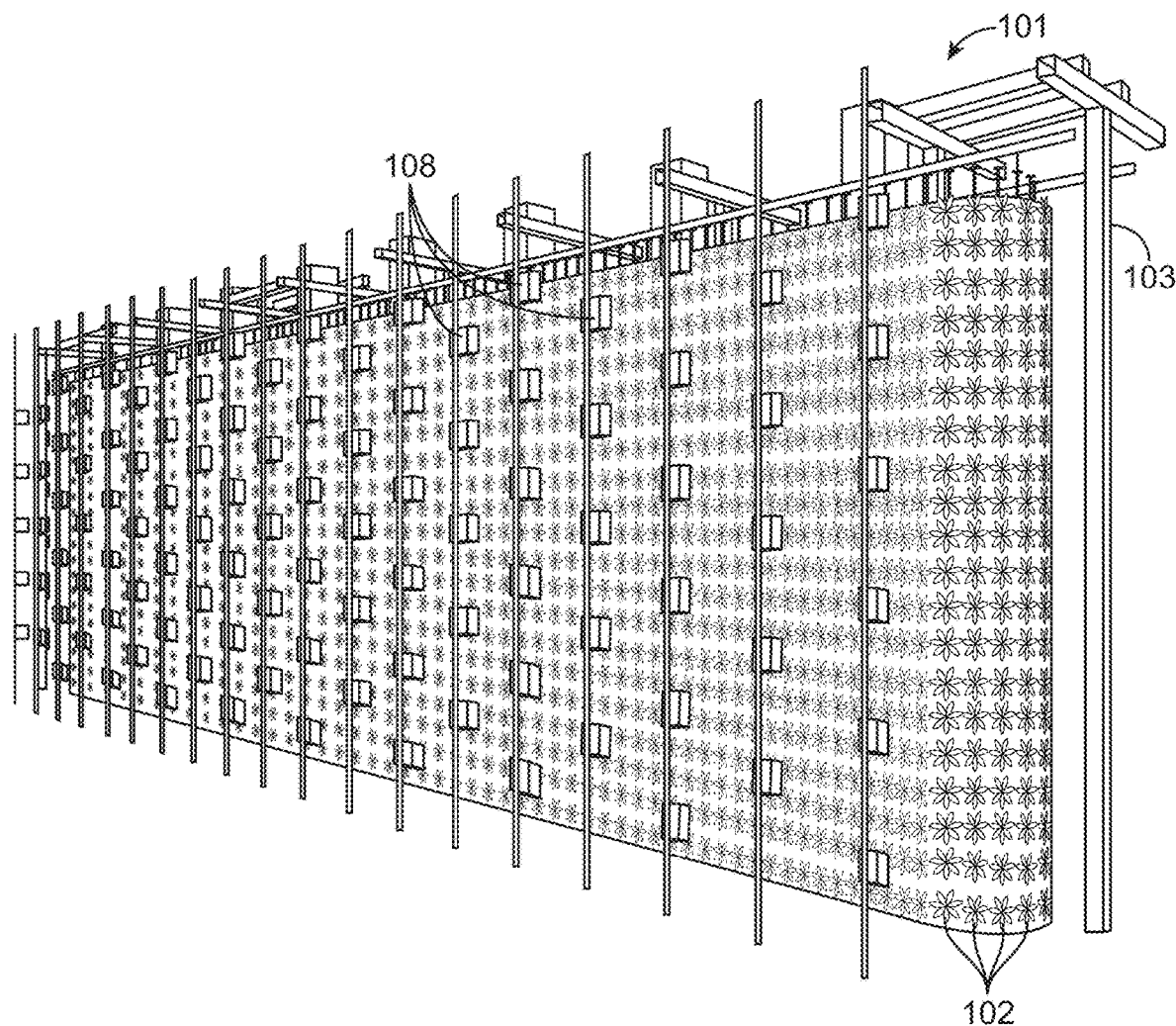
FIG. 3 is another illustrative isometric view of one multi-stage vertical growth system.

In some embodiments of the unsupported, self-standing tower, the conveyance system provides a controlled, timed movement of each unsupported, self-standing tower, in unison with the other unsupported, self-standing towers attached to the conveyance system, to move a plant contained within the plurality of enclosures from a starting point location corresponding with an immature growth stage to a finishing point corresponding with a harvestable plant along a circuit within an environmentally-controlled growing chamber, for example as depicted in FIGS. 2 and 3.

Figure 8A:
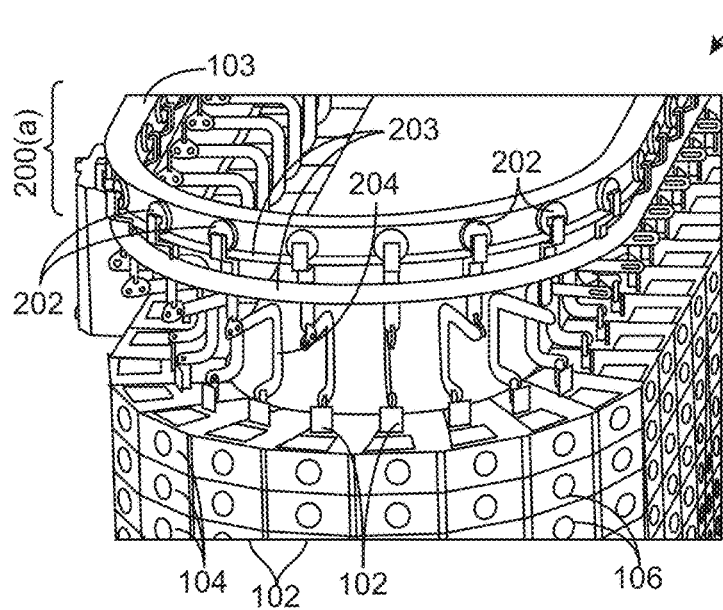
FIG. 8A is an illustrative isometric end view of an (optional) superiorly mounted conveyor system capable of moving the coupled vertical columns about a structural support circuit.

Referring now to FIG. 8A, one notes that the inventors have considered the inclusion of a conveyance system to facilitate the movement of the vertical growth assembly to provide for a regular cyclic rotation of crops from a germination stage to a harvest stage. As shown in the figure, one potential configuration of the conveyance system is attached to a vertical support structure as shown in FIG. 3, and connects to the vertical growth assembly at the top. The conveyance system is configured to move a plurality of tower or columnar assemblies about a circuit within the environmentally controlled growing chamber, for example as depicted in FIGS. 2 and 3.

The conveyance system can be a vertically driven 200(a), a bottom driven conveyance system (not shown), or combination of both. As shown in the non-limiting illustrations herein, the top-mounted conveyance components 200(a) comprise rollers 202, guiderails 203 mounted to the support structure 103, and vertical column hangers 204 for mounting directly to the vertical column 102. The hangers 204 are configurable to allow the vertical columns 104 to hang freely, if unsupported at the bottom, or to spin, if desired, as noted above.

Figure 8B:
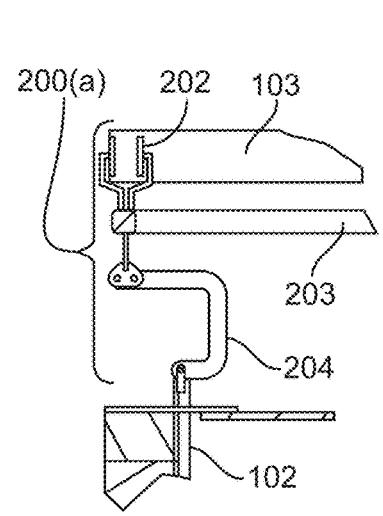
FIG. 8B is an illustrative side cross-section view of an (optional) superiorly mounted conveyor system capable of moving the coupled vertical columns about a structural support circuit.

In addition, or alternatively, the conveyance system is configured to connect to the bottom of the vertical growth assembly. The conveyance system on the bottom of the vertical growth assembly may be the same or different in configuration with the top conveyance system. For example, the bottom conveyance system is optionally configured to be a conveyor belt system, such as one used in airport luggage handling systems. This system is specifically designed to allow for turning the vertical growth assembly around the turns in a circuit, and optionally also provides the ability to rotate the entire vertical growth assembly about its central axis. Additionally, as shown if FIG. 8B, the conveyance system is alternately equipable with a hanger system capable of providing suspension of the vertical growth assembly.

In some embodiments, the unsupported, self-standing tower is between: approximately 10.0 feet and approximately 60.0 feet tall; approximately 10.0 feet and approximately 50.0 feet tall; approximately 10.0 feet and approximately 40.0 feet tall; approximately 10.0 feet and approximately 30.0 feet tall; approximately 10.0 feet and approximately 25.0 feet tall; approximately 10.0 feet and approximately 20.0 feet tall; approximately 10.0 feet and approximately 19.0 feet tall; approximately 10.0 feet and approximately 18.0 feet tall; approximately 10.0 feet and approximately 17.0 feet tall; approximately 10.0 feet and approximately 16.0 feet tall; or approximately 10.0 feet and approximately 15.0 feet tall.

As noted previously, the environmentally controlled vertical farming system is specifically designed to take greenhouse-like farming to a massive scale. As such, it is now obvious to one reading this application that the scale and size of the vertical growth structures, the towers and/or vertical growth column is only limited by the size and height of the facility holding the environmentally controlled vertical farming system and the capacity of the stacked growth modules, vertical growth columns, support structures and optional conveyance systems to support their collective weights. In any given embodiment, the unsupported, self-standing tower is conceivably between: approximately 10.0 feet and approximately 100.0 feet tall, or more. In other more common production environments embodiments, the unsupported, self-standing tower is between: approximately 10.0 feet and approximately 60.0 feet tall, where facilities permit. In smaller scale embodiments the unsupported, self-standing tower is between: approximately 10.0 feet and anywhere between approximately 15.0 feet to approximately 50.0 feet tall, as available facilities for these sizes are more common.

Provided herein is a vertical column for a vertical farming system configured for detachable attachment to at least one growth module, the vertical column comprising a periphery having: a square shape; a rectangular shape; a generally circular shape; a partially circular shape; triangular shape; a trapezoidal shape; a pentagonal shape; a hexagonal shape; a heptagonal shape; an octagonal shape; any geometric shape comprising non-flat sides; or any combination thereof; wherein the growth module comprises: a sleeve configured to hold a plurality of sub-growth modules; a housing configured to hold a plurality of sub-growth modules, each sub-growth module comprising an enclosure configured to securely hold at least one plant; a drain aperture in the growth module; and at least one lateral growth opening in the enclosure and/or at least one sub-growth module configured to permit growth of the at least one plant therethrough, and to encourage lateral growth of the at least one plant away from the growth module; wherein the growth module is configured to stackably support a plurality of other growth modules stacked above and/or below itself, wherein the drain aperture is configured to facilitate vertical flow of fluids from the growth module to another growth module stacked below itself, and wherein said lateral growth opening is configured to allow for an airflow to disrupt a boundary layer of an under-canopy of the at least one plant growing away from the growth module. In some embodiments, the vertical column comprises an at least partially hollow interior.

In some embodiments, the vertical column further comprising at least one attachment mechanism configured for detachable attachment to the growth module. In some embodiments, the at least one attachment mechanism comprises: a "T"-rail; a "V"-rail; a separable ring; a protruding notch; an indented notch; a slot; a groove; a through-hole and retaining pin; a magnet; or any combination thereof.

In some embodiments, the at least one attachment mechanism is on a longitudinal surface of said vertical column. In some embodiments, the at least one attachment mechanism is on a longitudinal surface of said vertical column. In some embodiments, the at least one growth module is attached in a radial pattern about the periphery of the vertical column.

In addition to the concept of vertical growth, unsupported, free-standing towers, the inventors have developed vertical columns comprising growth modules affixed thereto. The vertical column comprises a vertical internal or external support column. The support column can have a variety of peripheral shapes comprising a square shape; a rectangular shape; a generally circular shape; a partially circular shape; triangular shape; a trapezoidal shape; a pentagonal shape; a hexagonal shape; a heptagonal shape; an octagonal shape;

any geometric shape comprising non-flat sides; or any combination thereof, and is preferably at least partially hollow on the interior, but not required to be. Modules slide over, or onto the support column is some embodiments. In other embodiments, they attach to an attachment mechanism such as a "T"-rail; a "V"-rail; a separable ring; a protruding notch; an indented notch; a slot; a groove; a through-hole and retaining pin; a magnet; or any combination thereof.

Figure 5A:
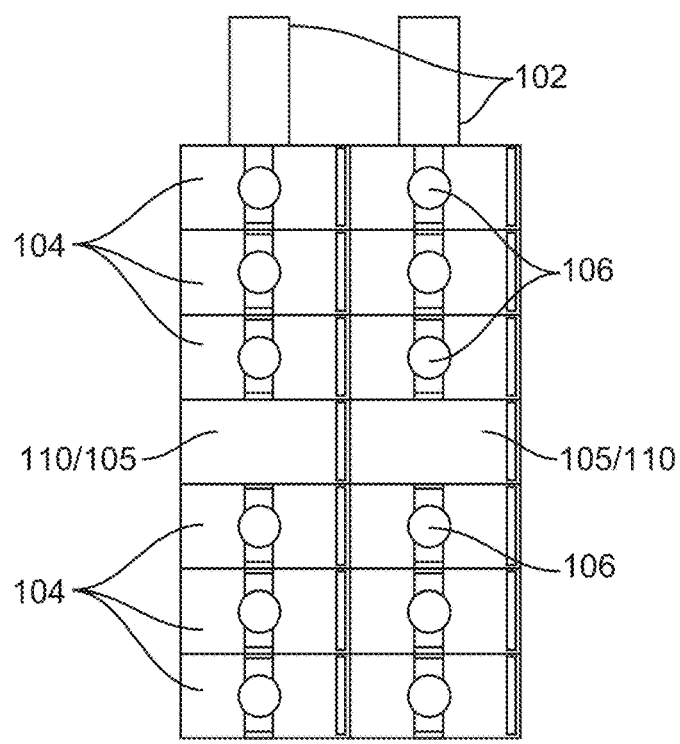
FIG. 5A is a front view of side-by-side vertical columns with illustrative representations of stacked growth modules comprising at least one lateral growth opening.
Figure 5B:
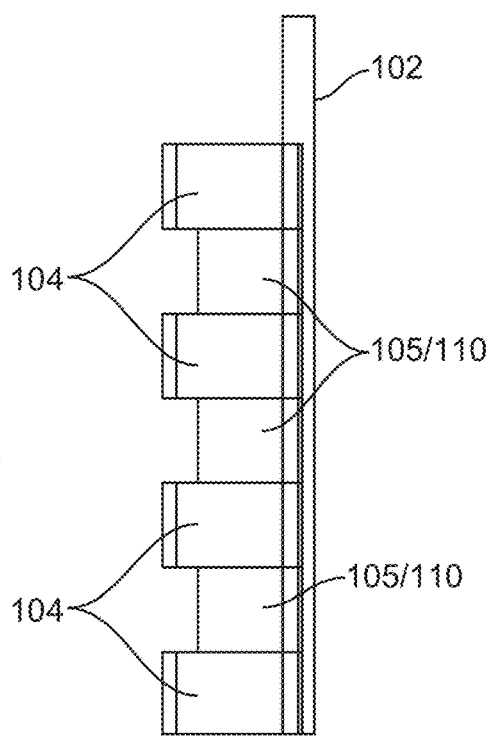
FIG. 5B is a side view of a vertical column with illustrative representations of stacked growth modules comprising at least one lateral growth opening and intermittent spacer/sensor modules placed between the hydroponic plant growth modules in the vertical column in a different arrangement.

FIGS. 5A through 5C, illustrate the concept of a "T"-rail or a "V"-rail on the vertical column for fixing the growth modules.

In some embodiments, alternatively, and/or in addition, the growth module further comprises a corresponding attachment mechanism such as a "T"-rail; a "V"-rail; a separable ring; a protruding notch; an indented notch; a slot; a groove; a through-hole and retaining pin; a magnet; or any combination thereof to facilitate attachment to the vertical column.

FIGS. 6A and 6B illustrate the concept of a corresponding "T"-rail or a "V"-rail on the growth modules for fixing the m to the vertical support column.

In any one of these configurations, one of skill in the art would recognize that the attachment mechanisms could be placed on any longitudinal surface of the column, allowing for radial placement of the non-circular growth modules circumferentially around the vertical column.

In some embodiments, the growth module of any one of the previously described configurations, the growth modules are detachably attachable to a vertical column with an external device comprising; a ring; a clamp; a collar; a bar collar; a quick-release clamp; a hose-type clamp; a magnet; a thru-pin; a cotter pin; a detachably attachable container affixed to the vertical column and configured to contain the growth module therein; or any combination thereof; wherein the detachably attachable container is configured to allow a stand-alone growth module to be slidably removed from the vertical column while leaving the detachably attachable container affixed to the vertical column.

In some embodiments the attachment mechanism is configured for placement either: between the growth module and column, adjacent to the growth module and column, or attached to both the vertical column and the growth module in order to provide both fixation and separated spacing of the growth modules along the vertical height of the column, such as: a ring; a clamp; a collar; a bar collar; a quick-release clamp; a hose-type clamp; a magnet; a thru-pin; a cotter pin; a detachably attachable container affixed to the vertical column and configured to contain the growth module therein; or any combination thereof. FIG. 5C illustrates the use of an external clamp used to augment the fixation between the vertical column and the growth module. In a similar fashion, a collar; a bar collar; a quick-release clamp; a hose-type clamp; a cotter pin; a magnetic ring or a through-hole and retaining pin are utilized to provide spacing between modules along the column.

In some embodiments, the vertical column is configured for attachment to a conveyance system for conveying the growth module to and/or away from the vertical column. In some embodiments, the vertical column configured for attachment to the conveyance system at a bottom end and/or a top end of the vertical column.

Just as with the tower configuration described previously, the vertical column configurations are configured for attachment to a conveyance system, with or without an auxiliary support structure, as illustrated in FIGS. 3 and 8A.

In some embodiments, a top end of the vertical column is configured for attachment to a support structure capable of supporting a plurality other vertical columns.

In some embodiments, the vertical column is configured to rotate about its vertical axis when attached to the support structure for uniformly exposing the attached growth modules to a light source and/or an airflow during each rotation.

In even further embodiments the vertical column is configured to hang from a support structure that allows the vertical column to rotate about its axis. Additionally, with at least one configuration it is shown that the growth module is able to spin about the column, even as the column spins. In still other embodiments, the vertical column is configured to rotate as a rotating pendulum, as illustrated in FIG. 7B, where suspended weights are utilized to balance the column and add inertia to the mass.

An additional benefit of any such rotating column or tower is the idea of self-induced airflow wherein a plant extending from a lateral growth opening is configured to allow for an airflow to disrupt a boundary layer of an under-canopy of the at least one plant growing away from the growth module. When a column or tower is configured to rotate, either by means of a conveyance system or as a suspended, rotating pendulum, airflow is induced around and through the extended under-canopy of the plant, which in turn will disrupt the boundary of the plants under-canopy.

In some embodiments, the vertical column is between: approximately 10.0 feet and approximately 60.0 feet tall; approximately 10.0 feet and approximately 50.0 feet tall; approximately 10.0 feet and approximately 40.0 feet tall; approximately 10.0 feet and approximately 30.0 feet tall; approximately 10.0 feet and approximately 25.0 feet tall; approximately 10.0 feet and approximately 20.0 feet tall; approximately 10.0 feet and approximately 19.0 feet tall; approximately 10.0 feet and approximately 18.0 feet tall; approximately 10.0 feet and approximately 17.0 feet tall; approximately 10.0 feet and approximately 16.0 feet tall; or approximately 10.0 feet and approximately 15.0 feet tall.

As with the previously discussed tower configurations, vertical growth column height is only limited by the size and height of the facility holding the environmentally controlled vertical farming system and the capacity of the stacked growth modules, vertical growth columns, support structures and optional conveyance systems to support their collective weights. In any given embodiment, the vertical growth column is conceivably between: approximately 10.0 feet and approximately 100.0 feet tall, or more. In other more common production environment embodiments, the vertical growth column is between: approximately 10.0 feet and approximately 60.0 feet tall, where facilities permit. In smaller scale embodiments the unsupported, self-standing tower is between: approximately 10.0 feet and anywhere between approximately 20.0 feet to approximately 50.0 feet tall, as available facilities for these sizes are more common.

In some embodiments, the vertical column is configured to provide at least one of: a forced airflow conduit; and a gravity-feed water and nutritional conduit; wherein the forced airflow conduit and the gravity-feed water and nutritional conduit are optionally, within the interior of the vertical column, or on the exterior of the vertical column, with ports accessible to and from an attached growth module of any shape.

As noted previously, a potentially preferred embodiment of the vertical growth column is at least partially hollow on the interior, but not required to be. In this embodiment, a forced airflow conduit and a water nutrient conduit are configured to optimally provide a steady, gravity-fed supply of air, water and nutrients to attached growth modules via selective ports located along the column. This has a number of advantages. First, it provides the ability to keep excessive tubing out of the way of the growth modules for loading and unloading operations. Second, it allows for the easy delivery of air, water and nutrients to any module located at any position along the length of the vertical column. Third, in the case of water and nutrients, it allows for supplemental delivery of nutrient rich water to plants further down the column which has not had any of the original concentration of nutrients diluted before delivery to the lower sections of the column.

In some embodiments of the vertical column, the conveyance system provides a controlled, timed movement of each unsupported, self-standing tower, in unison with the other unsupported, self-standing towers attached to the conveyance system, to move a plant contained within the plurality of enclosures from a starting point location corresponding with an immature growth stage to a finishing point corresponding with a harvestable plant along a circuit within an environmentally-controlled growing chamber, for example as depicted in FIGS. 2 and 3.

Again as noted with the towers, the inventors have considered the inclusion of a conveyance system to facilitate the movement of the vertical growth assembly to provide for a regular cyclic rotation of crops from a germination stage to a harvest stage. As shown in the figure, one potential configuration of the conveyance system is attached to a vertical support structure as shown in FIG. 3, and connects to the vertical growth assembly at the top. The conveyance system is configured to move a plurality of tower or columnar assemblies about a circuit within the environmentally controlled growing chamber.

In addition, or alternatively, the conveyance system is configured to connect to the bottom of the vertical growth assembly. The conveyance system on the bottom of the vertical growth assembly may be the same or different in configuration with the top conveyance system. For example, the bottom conveyance system is optionally configured to be a conveyor belt system, such as one used in airport luggage handling systems. This system is specifically designed to allow for turning the vertical growth assembly around the turns in a circuit, and optionally also provides the ability to rotate the entire vertical growth assembly about its central axis. Additionally, as shown if FIG. 8B, the conveyance system is alternately equipable with a hanger system capable of providing suspension of the vertical growth assembly In some embodiments, the column is configured to adapt to an adjustment in height of at least one of the growth modules so as to accommodate growth of the at least one plant.

Growth modules suitable for use with or in the control and sensor systems of the present disclosure include: an enclosure configured to securely hold at least one plant; a drain aperture in the enclosure; and at least one lateral growth opening in the enclosure configured to permit growth of the at least one plant therethrough, and to encourage lateral growth of the at least one plant away from the growth module; wherein the growth module is configured to support a plurality of growth modules stacked above and/or below itself, wherein the drain aperture is configured to facilitate vertical flow of fluids from the growth module to another growth module stacked below itself, and wherein said lateral growth opening is configured to allow for an airflow to disrupt a boundary layer of an under-canopy of the at least one plant growing away from the growth module.

In some embodiments, the enclosure is configured to provide a containment shape comprising: a completely circular shape; a partially circular shape; an elliptical shape; an irregular geometric shape; a non-symmetric, irregular geometric shape; a symmetric, multi-sided geometric shape; a triangular shape; a rectangular shape; a square shape; a trapezoidal shape; a pentagonal shape; a hexagonal shape; a heptagonal shape; an octagonal shape; a geometric shape comprising non-flat sides; or any combination thereof.

In some embodiments, the growth module further comprises at least a partial lower surface connected to the containment shape.

In some embodiments, the drain aperture is positioned in or near the at least partial lower surface.

In some embodiments, the at least partial lower surface optionally comprises a non-perpendicular surface relative to the containment shape, configured to facilitate the movement of fluids toward the drain aperture.

In some embodiments, the growth module further comprises at least a partial upper surface connected to the containment shape.

In some embodiments, the plurality of stacked growth modules is an unsupported, self-standing tower.

Provided herein is an unsupported, self-standing tower comprising a plurality of the growth modules of as previously described, wherein the plurality of stacked growth modules is configurable in a radially positioned orientation, and wherein the at least one lateral growth opening of each growth module is orientable in a different direction from the lateral growth opening of the growth module above and or below itself.

In some embodiments, the growth module of any one of the previously described configurations, further comprise an attachment mechanism configured for detachable attachment to a vertical column.

In some embodiments, the attachment mechanism comprises: a "T"-bar; a "V" bar; a hinge; a live hinge; a fixed lip; a separable ring; a protruding notch; an indented notch, a slot; a groove; a through-hole and retaining pin; a magnet; and any combination thereof; wherein the live hinge is further configured to allow a growth module to be opened or closed to allow for the insertion of removal of a plant from the growth module. As shown in more detail and in the non-limiting configurations in FIGS. 5A and 5B, 6A and 6B, and 7A and 7B, the hydroponic plant growth module 104, spacer 105 or sensor module 110 are configured to be mounted to the vertical column through one or a combination of fixed attachment features 109, such as hinges, wires, through-holes, bayonette features, suspension cables, notched steps or grooves. In some embodiments of the system, the hydroponic plant growth module additionally comprises a live hinge for detachable fixation to the vertical growth columns. In some embodiments, the hydroponic plant growth module additionally comprises a fixed lip or hinge arrangement or a (separable) ring for detachable fixation to the vertical growth columns.

Further still, in some embodiments, the hydroponic plant growth modules 104 and spacer modules 105 are configured in alterative shapes and configurations as illustrated in FIGS. 6A through 7C. As illustrated herein, the hydroponic plant growth module 104 is configured in a circular disc shape, having a through hole 102x configured to mate with and secure to the vertical growth column 102. As illustrated herein the vertical growth column 102 is configured in a cylindrical shape, as is the through-hole 102x of the hydroponic plant growth module 104. As noted previously, fixation of alternatively shaped hydroponic plant growth modules to the column at fixed vertical locations can be achieved through alternate means comprising wires, through-holes, bayonette features, suspension cables, notched steps or grooves. However, as one of skill in the art would easily recognize upon reading this disclosure, the shape of the vertical growth column 104 and/or the hydroponic plant growth module through-hole 102x (attachment mechanism) can be any shape, as illustrated by the growth module configuration in FIG. 7C, illustrating a polygonal configuration.

As further illustrated in FIG. 7C, a hydroponic plant growth module 104 can be configured with "sub-modules" 104s; comprising a plurality of hydroponic plant sub-module growth modules encased in a larger growth module housing. Each hydroponic plant sub-module 104s can detachably assemble to a primary hydroponic plant growth module 104, functions as a separate hydroponic plant growth module, and includes drain holes 13 and a lateral opening 106. Such a configuration would be ideally suited for smaller plants, seedlings and starter plant growth conditions, allowing for logistically compact growing conditions when spacing is less critical. Starter plants could then be re-seeded into larger hydroponic plant growth modules and placed back into the growth circuit at appropriate times to maintain a continuous growth pattern within the system.

Yet another configuration, as illustrated in FIG. 7B, shows a circular hydroponic plant growth module 104, as described above, configured for vertical suspension from an overhead supporting structure 101, 103 and/or conveyance system 200(a). In this configuration, a vertical growth column is configured to be free-hanging, and optionally allowed to spin or sway and provided with a counter-weight 40 for added stability. The hydroponic plant growth modules may alternately be configured with or without hydroponic plant sub-modules 104s, as described above, as well as separable, expandable side-walls 25.

Figure 7D:
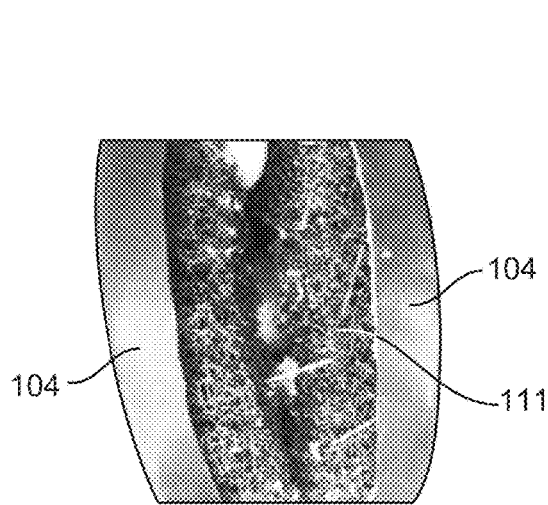
FIG. 7D is illustrative example of a porous growth medium that may be placed into a growth module.

In some embodiments, as illustrated in FIG. 7D, the growth module further comprises a growth medium 111 and a wicking medium (not shown) placed within the enclosure; wherein the wicking medium is wrapped within the growth medium and is configured to contain a root structure of the plant, and wherein the growth medium is configured to support the root structure of the plant 30 contained within the root system and to capture and hold moisture and nutrients, and wherein the wicking medium is configured to direct moisture and nutrients to the root structure of a plant contained therein.

Provided herein is a vertical column, configured for detachable attachment to the growth module, the vertical column comprising a periphery having: a square shape; a rectangular shape; a generally circular shape; a partially circular shape, triangular shape; a trapezoidal shape; a pentagonal shape; a hexagonal shape; a heptagonal shape; an octagonal shape; any geometric shape comprising non-flat sides; or any combination thereof.

In some embodiments, the vertical column comprises an at least partially hollow interior. In some embodiments, the vertical column is configured for attachment to a conveyance system for conveying the growth module to and/or away from the vertical column.

In some embodiments, the vertical column configured for attachment to the conveyance system at a bottom end and/or a top end of the vertical column.

In some embodiments, of the unsupported, self-standing tower, a top end of the unsupported, self-standing tower is configured for attachment to a conveyance system.

In some embodiments, a bottom end of the unsupported, self-standing tower is configured for attachment to the conveyance system.

In some embodiments, the vertical column further comprises at least one attachment mechanism configured for detachable attachment to the growth module.

In some embodiments, the at least one attachment mechanism comprises: a "T"-rail; a "V"-rail; a separable ring; a protruding notch; an indented notch; a slot; a groove; a through-hole and retaining pin; a magnet; or any combination thereof.

In some embodiments, the at least one attachment mechanism is on a longitudinal surface of said vertical column.

In some embodiments, the at least one growth module is attached in a radial pattern about the periphery of the vertical column.

In some embodiments, the vertical column is between: approximately 10.0 feet and approximately 60.0 feet tall; approximately 10.0 feet and approximately 50.0 feet tall; approximately 10.0 feet and approximately 40.0 feet tall; approximately 10.0 feet and approximately 30.0 feet tall; approximately 10.0 feet and approximately 25.0 feet tall; approximately 10.0 feet and approximately 20.0 feet tall; approximately 10.0 feet and approximately 19.0 feet tall; approximately 10.0 feet and approximately 18.0 feet tall; approximately 10.0 feet and approximately 17.0 feet tall; approximately 10.0 feet and approximately 16.0 feet tall; or approximately 10.0 feet and approximately 15.0 feet tall.

In some embodiments, the vertical column is configured to provide at least one of: a forced airflow conduit; and a gravity-feed water and nutritional conduit; wherein the forced airflow conduit and the gravity-feed water and nutritional conduit are optionally, within the interior of the vertical column, or on the exterior of the vertical column, with ports accessible to and from an attached growth module of any shape.

In some embodiments, the vertical column is adapted to support a plurality of the growth modules.

In some embodiments of the vertical column or unsupported, self-standing tower of any one of the previously described configurations, a top end of the vertical column or the unsupported, self-standing tower is configured for attachment to a support structure capable of supporting a plurality other vertical columns or unsupported, self-standing towers.

In some embodiments, of the vertical column or unsupported, self-standing tower the vertical column or unsupported, self-standing tower is configured to rotate about its vertical axis when attached to the support structure for similarly exposing the attached growth modules to a light source and/or an airflow.

In some embodiments, the vertical column further comprises: a guided vertical lift mechanism capable of supporting, raising and lowering the detachably attachable growth modules along the vertical length of the vertical column.

In some embodiments, the lift mechanism is configured on the exterior or the interior of the vertical column.

In some embodiments, the plurality of growth modules can be fixed at variable heights to accommodate variable stages of plant growth, with or without spaces between each vertical module.

In some embodiments, the variable heights are adjustable throughout a growth cycle.

In some embodiments, the plurality of growth modules can be fixed at a plurality of radial positions.

In some embodiments, the vertical column further comprises, a plurality of loading point locations along the length of the vertical column to facilitate loading and unloading the plurality of growth modules.

Certain vertical column or unsupported, self-standing towers suitable for use with or in the control and sensor systems of the present disclosure include any one of the previously described configurations, where the conveyance system provides a controlled, timed movement of each vertical column or unsupported, self-standing tower, in unison with the other vertical columns or unsupported, self-standing towers attached to the conveyance system, to move a plant contained within the plurality of growth modules from a starting point location corresponding with an immature growth stage to a finishing point corresponding with a harvestable plant along a circuit within an environmentally-controlled growing chamber.

Certain growth modules suitable for use with or in the control and sensor systems of the present disclosure include a growth medium and a wicking medium placed within an enclosure; wherein the wicking medium is wrapped within the growth medium and is configured to contain a root structure of the plant, and wherein the growth medium is configured to support the root structure of the plant contained within the root system and to capture and hold moisture and nutrients, and wherein the wicking medium is configured to direct moisture and nutrients to the root structure of a plant contained therein.

Certain growth modules suitable for use with or in the control and sensor systems of the present disclosure include a growth medium; a wicking medium; a root cluster of a germinated plant; or any combination thereof; wherein the environmental sensor or environmental sensor array is configured to collect environmental data within and around a growth module and transmit said data to a master control system capable of compiling the environmental data and adjusting environmental conditions within an environmentally-controlled growing chamber containing said growth module.

Certain growth modules suitable for use with or in the control and sensor systems of the present disclosure include a wicking strip and growth media angularly oriented within the growth module so as to promote the growth of the germinated plant through the lateral growth opening, wherein the angular orientation is an angle comprising between: about 0.0 degrees to about 45.0 degrees vertical of parallel to horizontal; about 0.0 degrees to about 40.0 degrees vertical of parallel to horizontal; about 0.0 degrees to about 35.0 degrees vertical of parallel to horizontal; about 0.0 degrees to about 34.0 degrees vertical of parallel to horizontal; about 0.0 degrees to about 33.0 degrees vertical of parallel to horizontal; about 0.0 degrees to about 32.0 degrees vertical of parallel to horizontal; about 0.0 degrees to about 31.0 degrees vertical of parallel to horizontal; or about 0.0 degrees to about 30.0 degrees vertical of parallel to horizontal.

Growth modules suitable for use with the control and sensor systems of the present disclosure may comprise an enclosure configured to securely hold at least one plant, wherein the enclosure further comprises at least two of the following: at least one vertical wall; a drain aperture in the enclosure; at least a partial lower surface connected to the enclosure; at least a partial upper surface connected to the enclosure; at least one lateral growth opening in the enclosure configured to permit growth of the at least one plant therethrough, and to encourage lateral growth of the at least one plant away from the growth module; a non-perpendicular, surface relative to the at least one vertical wall; an attachment mechanism configured for detachable attachment to a vertical column; an environmental sensor; an environment sensor array; a growth medium; and a wicking medium; wherein the enclosure is configured to provide a containment shape comprising: a completely circular shape; a partially circular shape; an elliptical shape; an irregular geometric shape; a non-symmetric, irregular geometric shape; a symmetric, multi-sided geometric shape; a triangular shape; a rectangular shape; a square shape; a trapezoidal shape; a pentagonal shape; a hexagonal shape; a heptagonal shape; an octagonal shape; a geometric shape comprising non-flat sides; or any combination thereof; wherein the growth module is configured to support a plurality of growth modules stacked above and/or below itself, wherein the drain aperture is configured to facilitate vertical flow of fluids from the growth module to another growth module stacked below itself, wherein said lateral growth opening is configured to allow for an airflow to disrupt a boundary layer of an under-canopy of the at least one plant growing away from the growth module, wherein the environmental sensor or environmental sensor array is configured to collect environmental data within and around a growth module and transmit said data to a master control system capable of compiling the environmental data and adjusting environmental conditions within an environmentally-controlled growing chamber containing said growth module, wherein the wicking medium is wrapped within the growth medium and is configured to contain a root structure of the plant, wherein the growth medium is configured to support the root structure of the plant contained within the root system and to capture and hold moisture and nutrients, wherein the wicking medium is configured to direct moisture and nutrients to the root structure of a plant contained therein; and wherein the growth module has an adjustable height to accommodate growth of the at least one plant.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A vertical farming system, the system comprising:
an environmentally-controlled growing chamber;
a vertical growth column located within said environmentally-controlled growing chamber;
a plurality of growth modules configured for use with said vertical growth column, each growth module of said plurality of growth modules comprising (i) an attachment mechanism configured for detachable attachment of each growth module to said vertical growth column, (ii) a growth media contained within each growth module of said plurality of growth modules, (iii) a growth opening configured to allow at least one growing plant to grow through said growth opening of each growth module of said plurality of growth modules, and (iv) an upper opening and a lower opening configured to allow an aqueous crop nutrient solution to flow therethrough;

a light emitting source configured to emit light toward said growth opening of each growth module of said plurality of growth modules;

a measuring device configured to monitor a growth characteristic of a crop grown within said plurality of growth modules during plant growth of said crop;

a first sensor system configured to monitor a plurality of operating conditions within said environmentally-controlled growing chamber, said plurality of operating conditions including humidity, ambient carbon dioxide concentration, ambient oxygen concentration, and temperature during plant growth of said crop, wherein the first sensor system comprises a first sensor unit coupled to the vertical growth column, and the first sensor unit is configured to monitor the plurality of operating conditions;

a second sensor system configured to monitor flow rate of said aqueous crop nutrient solution through said plurality of growth modules during plant growth of said crop;

a regulatory system configured to control humidity, ambient carbon dioxide concentration, ambient oxygen concentration, and temperature within said environmentally-controlled growing chamber and to control flow rate of said aqueous crop nutrient solution through said plurality of growth modules; and a control system comprising at least one processor, a memory, and an operating system, said control system configured to receive (i) a first set of data from said measuring device, said first set of data corresponding to said growth characteristic, (ii) a second set of data from said first sensor system, said second set of data corresponding to said plurality of operating conditions, (iii) a third set of data from said second sensor system, said third set of data corresponding to said flow rate of said aqueous crop nutrient solution through said plurality of growth modules, said control system further configured to apply an algorithm to the first, second and third sets of data to generate an improved growing condition for said crop and store the improved growing condition in the memory, said control system further configured to automatically generate and transmit instructions to said regulatory system during plant growth of said crop for real time adjustment of said humidity, ambient carbon dioxide concentration, ambient oxygen concentration, and temperature within said environmentally-controlled growing chamber and of said flow rate of said aqueous crop nutrient solution through said plurality of growth modules to implement the improved growing condition.

2. The vertical farming system of claim 1, said second sensor system further configured to monitor a second temperature corresponding to the aqueous crop nutrient solution, wherein said third set of data from said second sensor system corresponds to said flow rate of said aqueous crop nutrient solution and said second temperature, wherein said regulatory system is further configured to control said second temperature corresponding to said aqueous crop nutrient solution, and wherein said control system is further configured to automatically generate and transmit a second set of instructions to said regulatory system for adjustment of said second temperature corresponding to said aqueous crop nutrient solution to implement the improved growing condition.

3. The vertical farming system of claim 1, said second sensor system further configured to monitor an aqueous pH of the aqueous crop nutrient solution, wherein said third set of data from said second sensor system corresponds to said flow rate of said aqueous crop nutrient solution and said aqueous pH of said aqueous crop nutrient solution, wherein said regulatory system is further configured to control said aqueous pH of said aqueous crop nutrient solution, and wherein said control system is further configured to automatically generate and transmit a second set of instructions to said regulatory system for adjustment of said aqueous pH of said aqueous crop nutrient solution to implement the improved growing condition.

4. The vertical farming system of claim 1, wherein the crop characteristic is plant mass.

5. The vertical farming system of claim 1, wherein the crop characteristic is sugar content.

6. The vertical farming system of claim 1, wherein the crop characteristic is acidity.

7. The vertical farming system of claim 1, said second sensor system further configured to monitor a nutrient concentration within said aqueous crop nutrient solution, wherein said third set of data from said second sensor system corresponds to said flow rate of said aqueous crop nutrient solution and said nutrient concentration within said aqueous crop nutrient solution, wherein said regulatory system is further configured to control said nutrient concentration of said aqueous crop nutrient solution, and wherein said control system is further configured to automatically generate and transmit a second set of instructions to said regulatory system for adjustment of said nutrient concentration of said aqueous crop nutrient solution to implement the improved growing condition.

8. The vertical farming system of claim 1, wherein the first sensor unit is configured to monitor the plurality of operating conditions at a plant canopy level from the vertical growth column.

\* \* \* \* \*